US011949176B2

(12) United States Patent

Wang et al.

(10) Patent No.: US 11,949,176 B2
(45) Date of Patent: Apr. 2, 2024

(54) BEAM FORMING ANTENNAS HAVING DUAL-POLARIZED DIELECTRIC RADIATING ELEMENTS THEREIN

(71) Applicant: CommScope Technologies LLC, Hickory, NC (US)

(72) Inventors: Huan Wang, Richardson, TX (US); Michael Brobston, Allen, TX (US); Martin L. Zimmerman, Chicago, IL (US); Vadim Zlotnikov, Dallas, TX (US)

(73) Assignee: CommScope Technologies LLC, Claremont, NC (US)

( * ) Notice: Subject to any disclaimer, the term of this patent is extended or adjusted under 35 U.S.C. 154(b) by 276 days.

(21) Appl. No.: 17/624,023

(22) PCT Filed: Jul. 7, 2020

(86) PCT No.: PCT/US2020/040978

§ 371 (c)(1),
(2) Date: Dec. 30, 2021

(87) PCT Pub. No.: WO2021/007198

PCT Pub. Date: Jan. 14, 2021

(65) Prior Publication Data

US 2022/0359989 A1 Nov. 10, 2022

Related U.S. Application Data

(60) Provisional application No. 62/951,179, filed on Dec. 20, 2019, provisional application No. 62/872,552, (Continued)

(51) Int. Cl.
*H01Q 1/24* (2006.01)
*H01Q 9/04* (2006.01)
(Continued)

(52) U.S. Cl.
CPC ......... *H01Q 9/0485* (2013.01); *H01Q 19/108* (2013.01); *H01Q 21/08* (2013.01);
(Continued)

(58) Field of Classification Search
CPC .... H01Q 9/0485; H01Q 21/08; H01Q 19/108; H01Q 21/26; H01Q 21/24; H01Q 13/10; H01Q 13/18
See application file for complete search history.

(56) References Cited

U.S. PATENT DOCUMENTS

| | | | |
|---|---|---|---|
| 5,952,972 | A | 9/1999 | Ittipiboon et al. |
| 7,283,101 | B2 | 10/2007 | Bisiules et al. |

(Continued)

FOREIGN PATENT DOCUMENTS

| | | | |
|---|---|---|---|
| WO | 2015192167 | A1 | 12/2015 |
| WO | 2019079123 | A1 | 4/2019 |

OTHER PUBLICATIONS

Notification of Transmittal of the International Search Report and the Written Opinion of the International Searching Authority, or the Declaration, in corresponding PCT Application No. PCT/US2020/040978 (23 pages) (dated Dec. 3, 2020).

(Continued)

*Primary Examiner* — Joseph J Lauture
(74) *Attorney, Agent, or Firm* — Myers Bigel, P.A.

(57) ABSTRACT

Beam forming antennas for base station applications are configured as dielectric resonator antennas (DRAs) having arrays of dielectric resonator radiating elements (DRRE) therein with dual-polarized radiating properties. Each DRRE includes a dielectric radiating element (DRE) electromagnetically coupled by a resonant cavity to a respective cross-polarized feed network, which is responsive to first and second radio frequency (RF) input feed signals. Each resonant cavity may be configured as a polymer-filled resonant (Continued)

cavity, and each DRE may be configured as a cylindrically-shaped or dome-shaped dielectric radiating element.

20 Claims, 24 Drawing Sheets

Related U.S. Application Data filed on Jul. 10, 2019, provisional application No. 62/871,873, filed on Jul. 9, 2019.

(51) Int. Cl.

| | |
|---|---|
| ***H01Q 19/10*** | (2006.01) |
| ***H01Q 21/08*** | (2006.01) |
| ***H01Q 21/26*** | (2006.01) |
| *H01Q 13/10* | (2006.01) |
| *H01Q 13/18* | (2006.01) |
| *H01Q 21/24* | (2006.01) |

(52) U.S. Cl.
CPC ............ *H01Q 21/26* (2013.01); *H01Q 13/10* (2013.01); *H01Q 13/18* (2013.01); *H01Q 21/24* (2013.01)

(56) References Cited

U.S. PATENT DOCUMENTS

| | | | |
|---|---|---|---|
| 2003/0117244 A1 | 6/2003 | Matsuura et al. | |
| 2004/0004576 A1 | 1/2004 | Anderson | |
| 2004/0263392 A1 | 12/2004 | Bisiules et al. | |
| 2005/0012673 A1 | 1/2005 | Parsche et al. | |
| 2015/0349425 A1 | 12/2015 | Kitchener | |
| 2017/0256864 A1* | 9/2017 | Jensen ............... | H01Q 13/0241 |

OTHER PUBLICATIONS

Tang et al. “Differential Dual-Band Dual-Polarized Dielectric Resonator Antenna” IEEE Transactions on Antennas and Propagation 65(2) (Feb. 2017).

* cited by examiner

BEAM FORMING ANTENNAS HAVING DUAL-POLARIZED DIELECTRIC RADIATING ELEMENTS THEREIN

CLAIM OF PRIORITY

This application is a 35 U.S.C. § 371 national stage application of PCT Application No. PCT/US2020/040978, filed on Jul. 7, 2020, which claims priority to U.S. Provisional Patent Application No. 62/871,873, filed Jul. 9, 2019, U.S. Provisional Patent Application No. 62/872,552, filed Jul. 10, 2019, and U.S. Provisional Patent Application No. 62/951,179, filed Dec. 20, 2019, the disclosures of which are hereby incorporated herein by reference. The above-referenced PCT Application was published in the English language as International Publication No. WO 2021/007198 A1 on Jan. 14, 2021.

FIELD OF THE INVENTION

The present invention relates to antennas and, more particularly, to dielectric resonator antennas for wireless communication systems.

BACKGROUND

Beam forming antennas often require relatively large scan angles of up to ±60° away from the boresight of an antenna reflector. Unfortunately, traditional base station antennas are typically unable to realize acceptable performance at such large ±60° scan angles because of the relatively narrow beamwidth of the radiating element patterns, relatively poor active return losses, relatively poor isolation between the orthogonal polarizations (self-ISO), and relatively poor isolation between adjacent radiating elements (inter-ISO).

Dielectric resonator antennas (DRAs) may offer a number of advantages relative to other antenna technologies, such as relatively high radiation efficiency, relatively low dissipation loss, small size, low weight, ease of excitation and design flexibility. Based on these advantages, DRAs, including dual-polarized DRAs, are being evaluated as potential replacements for some beam forming antennas and other metallic-based antennas.

Referring now to FIG. 1, a conventional rectangular-shaped DRA 10 is illustrated, which has a volume of "a"ד"b"ד"d" and is disposed on a ground plane reflector 12. The DRA 10 is fed by a conducting strip 14, which is provided through a coaxial aperture in the reflector 12. As illustrated, the conducting strip 14, which extends along and contacts a side of the DRA 10, has a length $l_1$ and a width $W_1$. As will be understood by those skilled in the art, the ground plane reflector 12 can be modeled as a perfect electric conductor (PEC) wall. Moreover, if the dielectric material within the DRA 10 has a very high dielectric constant (e.g., $\varepsilon_r$>100), then an interface between the DRA 10 and its surrounding ambient (e.g., air) can be modeled as a perfect magnetic conductor (PMC) wall, which means the electromagnetic (EM) power within the DRA 10 and at the PMC boundary will not penetrate into the ambient, but will reflect internally and support resonance therein. However, if the dielectric material within the DRA 10 has a somewhat lower dielectric constant (e.g., $\varepsilon_r \approx 9.4$, for alumina ceramic), the PMC boundary will no longer be "perfect" and the resonant mode (i.e., Eigen-mode) power will leak out from the DRA 10, thus providing resonant radiation that may support antenna function.

Referring now to FIG. 2, an alumina-based rectangular-shaped DRA 10' is provided, which extends on a PEC ground reflector 12' and is fed by an inner conductor 14' of a coaxial cable that extends through an aperture of the reflector 12'. Based on this configuration, the lowest Eigen-mode frequency $f_0$ of the DRA 10', assuming a PMC-hypothesis dielectric waveguide model, is calculated from the following three (3) equations, where: "c" is the speed of light in a vacuum, "a", "b" and "d" are the rectangular dimensions of the DRA 10' in the x, y and z directions, the TE111y mode is the lowest Eigen-mode (fundamental resonance mode), the letters TE and y denote the E-field vectors being always transverse to the y-axis, and the numbers of the half-waves (standing-wave mode) are m=1, n=1 and l=1, respectively, associated with the x, y and z directions:

$$f_0=(c/2\pi(\varepsilon_r)^{1/2})((k_x)^2+(k_y)^2+(k_z)^2)^{1/2}, \quad (1)$$

$$k_x=m\pi/a, k_y=n\pi/b, k_z=1\pi/2d, \quad (2)$$

$$(k_x)^2+(k_y)^2+(k_z)^2=\varepsilon_r(k_0)^2 \quad (3)$$

One example of a cross-shaped dual-polarized DRA is disclosed in U.S Patent Publication No. 2003/0117244 to Matsuura et al., entitled "Dielectric Resonance Element, Dielectric Resonator, Filter, Resonator Device, and Communication Device." This cross-shaped DRA is applied as a differential dual-band dual-polarized DRA in an article by Tang et al., entitled "Differential Dual-Band Dual-Polarized Dielectric Resonator Antenna," IEEE Trans. on Antennas and Propagation, Vol. 65, No. 2, February (2017). As illustrated by FIGS. 5(*a*)-5(*b*) of Tang et al., which are reproduced herein as FIGS. 3A-3B, the DRA 30 is differentially fed at four ports (i.e., ports (1, 1') and (2, 2')) by coaxial cables having center conductors 38. These center conductors 38 are provided through four SMA connectors 36, which extend through coaxial apertures on a metallic ground plane 32. To prevent any adverse influence on the field distributions of the modes inside the DRA 30, two pairs of conformal and narrow metallic sidewall strips 34 are provided, which have a width $w_s$ and a length $l_s$. As will be understood by those skilled in the art, the orthogonality and high isolation between corresponding modes in the dielectric resonator provide a DRA 30 with dual polarization. Compared with the single-ended fed DRAs 10, 10' of FIGS. 1-2, the differentially fed DRA 30 of FIGS. 3A-3B suppresses higher order modes and provides each polarization with less interaction between orthogonal modes resulting in relatively higher isolation between the two polarizations. In addition, differential excitation provides a pair of equivalent amplitude and out-of-phase signals to feed the DRA 30. The radiations excited by the two signals and orthogonal to the main beam cancel out, resulting in cross-polarization reduction of the DRA 30.

Referring now to FIG. 4, a cross-dipole radiating element (CDE) 40 with ±45° dual-polarization is illustrated, which is assembled from two printed circuit boards (PCB) 42*a*, 42*b* having feed ports "n1" and "p1" connected to corresponding PCB feedlines. This CDE 40 is similar to the CDE described and illustrated at FIGS. 3*a*-3*e* of commonly assigned U.S. Pat. No. 7,283,101 to Bisiules et al., which is hereby incorporated herein by reference. However, two additional "front" dipole arms (for each +45° and −45° polarization) are provided, which are electrically connected to back dipole arms via printed through-hole (PTH) vias, and the feedline end closer to the dipole arm is electrically connected (short circuited) to the dipole arm through a PTH via.

SUMMARY OF THE INVENTION

Beam forming antennas for base station applications may be configured as dielectric resonator antennas (DRAs) having arrays of dielectric resonator radiating elements (DRRE) therein with dual-polarized radiating properties. According to some embodiments of the invention, each DRRE may include a dielectric radiating element (DRE) coupled to a respective cross-polarized feed network, which is responsive to first and second radio frequency (RF) input feed signals. In some embodiments of the invention, each DRE is electromagnetically coupled by a resonant cavity to a corresponding cross-polarized feed network. Each DRE may also be configured as a cylindrically-shaped or dome-shaped dielectric radiating element in some embodiments of the invention.

According to additional embodiments of the invention, each DRRE may include an electrically conductive patch radiator, which is responsive to a plurality of RF feed signals provided by a corresponding cross-polarized feed network. Each resonant cavity may also be defined, at least partially, by first and second spaced-apart and electrically conductive planes, which are electrically coupled together by a ring-shaped array of electrically conductive vias extending between the first and second electrically conductive planes. The resonant cavity may also be at least partially filled by a material having a relatively low dielectric constant relative to a dielectric constant of the DRE. For example, the resonant cavity may be at least partially filled by a polymer, and the electrically conductive vias in the ring-shaped array may extend through the polymer, which may be polytetrafluoroethylene (PTFE). According to further aspects of these embodiments of the invention, a center-to-center spacing between the electrically conductive vias in the ring-shaped array may be less than about $\lambda_s/8$, where $\lambda_s$ is a wavelength of the plurality of RF feed signals in the polymer "substrate". The patch radiator may also be coplanar with the second electrically conductive plane, and a perimeter of the patch radiator may be separated from the second electrically conductive plane by a ring or annular-shaped slot extending therebetween. The DRE may be electromagnetically coupled through the ring-shaped slot to an interior of the resonant cavity. The plurality of RF feed signals may include: (i) the first RF input feed signal, (ii) a 180° phase-delayed version of the first RF input feed signal, (iii) the second RF input feed signal, and (iv) a 180° phase-delayed version of the second RF input feed signal.

In some of these embodiments of the invention, the cross-polarized feed network may include a pair of metal traces on a first surface of a printed circuit board (PCB) substrate, and the first electrically conductive plane may extend on a second surface of the PCB substrate. The pair of metal traces may include: (i) a first metal trace, which is electrically coupled to a first pair of plated through-holes in the PCB substrate and responsive to the first RF input feed signal, and (ii) a second metal trace, which is electrically coupled to a second pair of plated through-holes in the PCB substrate and responsive to the second RF input feed signal.

In other embodiments of the invention, the DRE may be configured as a nested arrangement of a plurality of dielectric radiating sub-elements, which extends on the patch radiator. This plurality of dielectric radiating sub-elements can include N dielectric radiating sub-elements, which are disposed in a nested manner within a larger N+1th dielectric radiating sub-element, where N is a positive integer. In addition, one or more of the N+1 dielectric radiating sub-elements can be cylindrically-shaped or dome-shaped, such that N cylindrically-shaped sub-elements can be nested within an N+1th cylindrically-shaped sub-element, or N dome-shaped sub-elements can be nested within an N+1th dome-shaped sub-element, for example. Other combinations of nested sub-elements are also possible, and each of the sub-elements within a nested arrangement may be formed from the same (or possibly different) dielectric material(s). The use of nested sub-elements may also provide for an improvement in overall material characteristics within the DRE, particularly when the DRE is to be formed using injection-mold fabrication techniques.

According to additional embodiments of the invention, a dielectric resonator radiating element (DRRE), which may be used within a beam forming dielectric resonator antenna, can include a cylindrically-shaped or dome-shaped dielectric radiating element (DRE). This DRE may be electromagnetically coupled through a cylindrically-shaped and polymer-filled resonant cavity to a cross-polarized feed network. This polymer-filled resonant cavity may extend within a partially metallized polymer disc, and the DRE may be electromagnetically coupled to an interior of the resonant cavity via an annular-shaped slot in the metallized polymer disc. According to some embodiments of the invention, the metallized polymer disc may include a circular patch radiator, and the cross-polarized feed network may include a plurality of electrically conductive vias, which extend through the polymer-filled resonant cavity and make contact to respective portions of the patch radiator.

According to still further embodiments of the invention, a dielectric resonator radiating element (DRRE) of a beam forming antenna is provided, which includes a cross-polarized feed network and a dielectric radiating element (DRE) electromagnetically coupled to a resonant cavity. This resonant cavity can have a partially metallized exterior and an interior electromagnetically coupled to a plurality of radio frequency (RF) feed signals generated by the cross-polarized feed network. This partially metallized exterior can include an annular-shaped slot therein, and the DRE may be electromagnetically coupled through the annular-shaped slot to a polymer-filled interior of the resonant cavity. The cross-polarized feed network may also include a plurality of electrically conductive vias, which receive the plurality of RF feed signals and extend at least partially through the polymer-filled resonant cavity. An electrically conductive patch radiator may also be provided, which extends on the resonant cavity and is electrically connected to the plurality of electrically conductive vias. This patch radiator may extend between the DRE and the interior of the resonant cavity.

According to additional embodiments of the invention, a dielectric resonator radiating element (DRRE) is provided, which includes a polymer disc (e.g., polytetrafluoroethylene (PTFE)) having a metallized sidewall and a partially-metallized front facing surface. A dielectric radiating element (DRE) is provided on the polymer disc. This DRE is electromagnetically coupled to an interior of the polymer disc through an opening in the partially-metallized front facing surface. A cross-polarized feed network is provided, which is electrically coupled to the interior of the polymer disc. In some of these embodiments of the invention, the polymer disc may have a rear facing surface, which is free of metallization and contacts a front-facing surface of the cross-polarized feed network. The polymer disc may also include a plurality of plated through-holes therein, which are electrically connected to metal traces on the cross-polarized feed network. A front facing surface of the polymer disc may also include a circular patch radiator thereon, which is electrically connected to the cross-polarized feed network via the plated through-holes.

Still further embodiments of the invention may include an antenna containing a feed network, which is responsive to at least a first radio frequency (RF) input feed signal, and a dielectric radiating element (DRE), which is electromagnetically coupled through a patch radiator to the feed network. In some of these embodiments of the invention, the DRE may be configured as a nested arrangement of a plurality of dielectric radiating sub-elements. For example, the plurality of dielectric radiating sub-elements may include N+1 dielectric radiating sub-elements, where N is a positive integer, and N of the dielectric radiating sub-elements may be received within a larger N+1th dielectric radiating sub-element. At least some of the plurality of dielectric radiating sub-elements may be cylindrically-shaped or dome-shaped, and one or more of the N+1 sub-elements within a nested arrangement may be formed from the same dielectric material(s).

The feed network may also be a cross-polarized feed network, which is responsive to first and second RF input feed signals, and the DRE may be electromagnetically coupled by a resonant cavity to the cross-polarized feed network. This resonant cavity may be at least partially enclosed within a metallized ring-shaped cavity sidewall, which extends between the DRE and the cross-polarized feed network. The DRE may also extend adjacent a DRE-facing surface of the patch radiator and a DRE-facing surface of the metallized ring-shaped cavity sidewall, which may be coplanar with the DRE-facing surface of the patch radiator.

According to still further embodiments of the invention, a dielectric resonator antenna (DRA) is provided, which includes a cross-shaped and dielectric block having a plurality of slots therein, and a cross-dipole radiating element (CDE) sufficiently embedded within the plurality of slots that the cross-shaped dielectric block operates as a dipole-fed DRA. In some of these embodiments of the invention, the plurality of slots includes four slots aligned along a pair of orthogonal axes of the cross-shaped dielectric block. In addition, the cross-shaped dielectric block may have a cavity therein that surrounds a feed stalk of the CDE. This cavity may have a longitudinal axis that is aligned to an intersection between the pair of orthogonal axes, and may be rectangular shaped.

According to additional embodiments of the invention, the CDE may be configured from a pair of printed circuit board dipoles, and a feed stalk of the CDE may divide the cavity into four air-filled quadrants. A spacer may also be provided, which surrounds a portion of the CDE and extends between the dielectric block and a reflector on which the CDE is mounted. In some embodiments of the invention, the spacer may be configured as a polymer, such as polytetrafluoroethylene. In other embodiments of the invention, the spacer may be annular-shaped and have a dielectric constant of less than about four (4), whereas the dielectric block may utilize a dielectric material having a dielectric constant of greater than about four (4).

According to additional embodiments of the invention, a dielectric resonator antenna (DRA) is provided, which includes a cross-shaped and unitary dielectric block having a first pair of coplanar slots and a second pair of coplanar slots therein. These first and second pairs of coplanar slots are configured to receive a cross-dipole radiating element (CDE) therein. In particular, the CDE may have a first pair of dipole arms received within the first pair of coplanar slots, and a second pair of dipole arms received within the second pair of coplanar slots. This cross-shaped and unitary dielectric block may further include a cavity extending at least partially therethrough, and at least a portion of a feed stalk of the cross-dipole radiating element may extend within the cavity. This cavity may be a rectangular-shaped cavity having a longitudinal axis aligned to an axis extending through a center of the cross-shaped and unitary dielectric block.

DETAILED DESCRIPTION OF EMBODIMENTS

Figure 1:
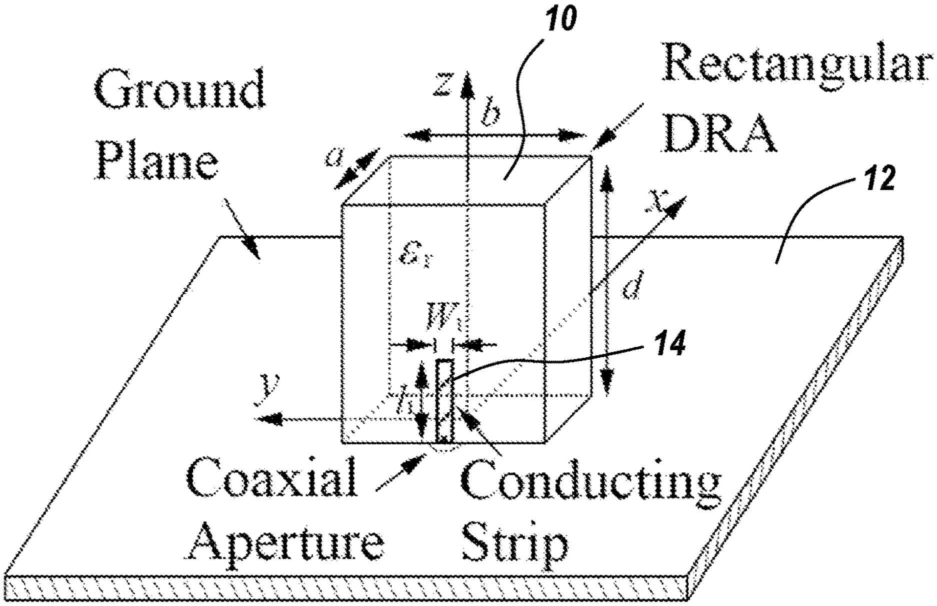
FIG. 1 (PRIOR ART)
FIG. 1 is a perspective view of a conventional rectangular-shaped dielectric resonator antenna (DRA), which is disposed on a metal ground plane reflector and stimulated by a single conducting strip that is coaxially-fed through an aperture in the reflector.
Figure 2:
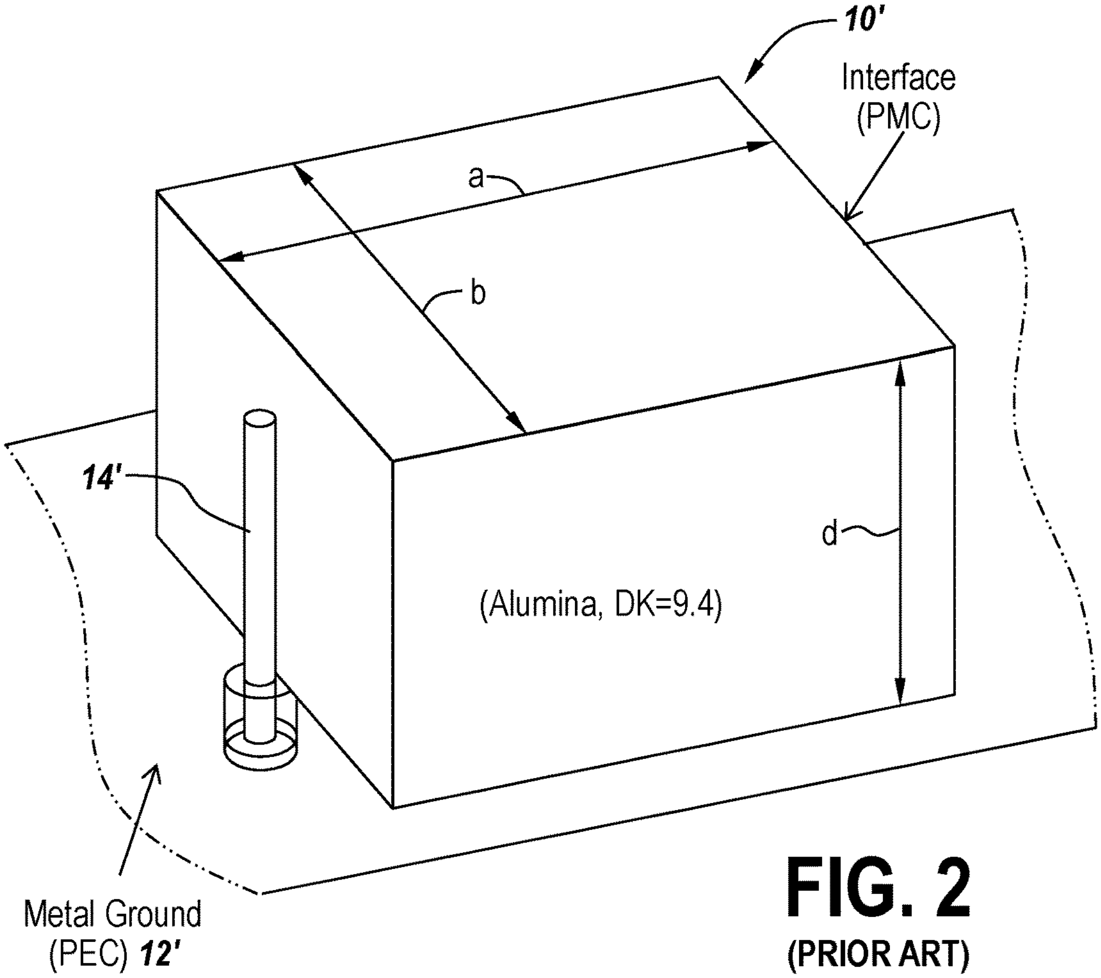
FIG. 2 (PRIOR ART)
FIG. 2 is a perspective view of a conventional rectangular-shaped alumina DRA on a metal ground plane reflector, which is fed by a coaxial probe extending through the reflector.
Figure 3A:
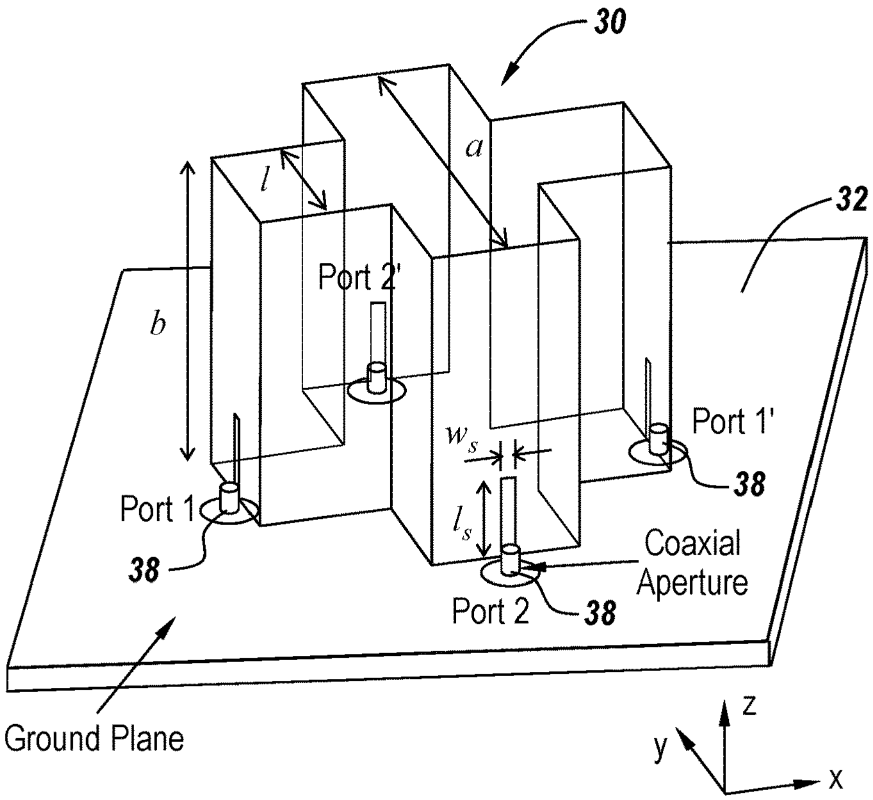
FIG. 3A (PRIOR ART)
FIG. 3A is a perspective view of a conventional differential dual-band, dual-polarized, and cross-shaped DRA on a ground plane reflector, which is orthogonally-fed by coaxial probes. These coaxial probes are electrically coupled to metallic strips having a width $w_s$ and length $l_s$, which are located at 4 distal ends of the cross-shaped DRA.
Figure 3B:
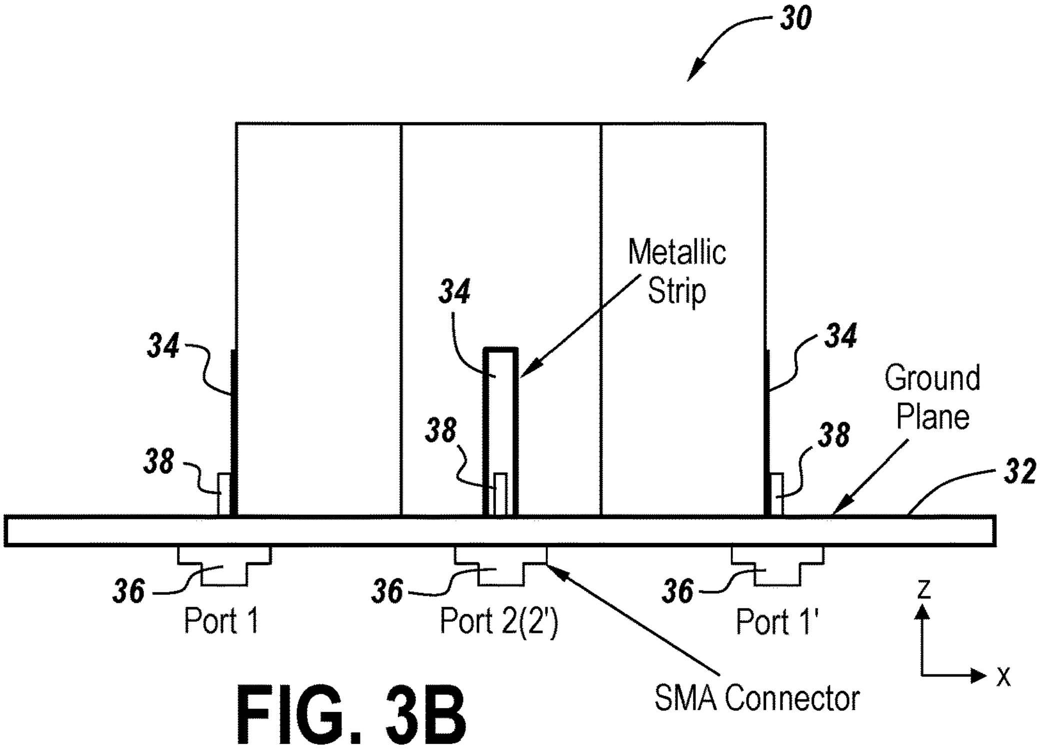
FIG. 3B (PRIOR ART)
FIG. 3B is a side view of the DRA of FIG. 3A, which illustrates underside SMA coaxial connectors, which are electrically coupled to coaxial apertures in the reflector.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context f the relevant art and will not be interpreted in an idealized or overly formal sense unless expressly so defined herein.

Figure 5A:
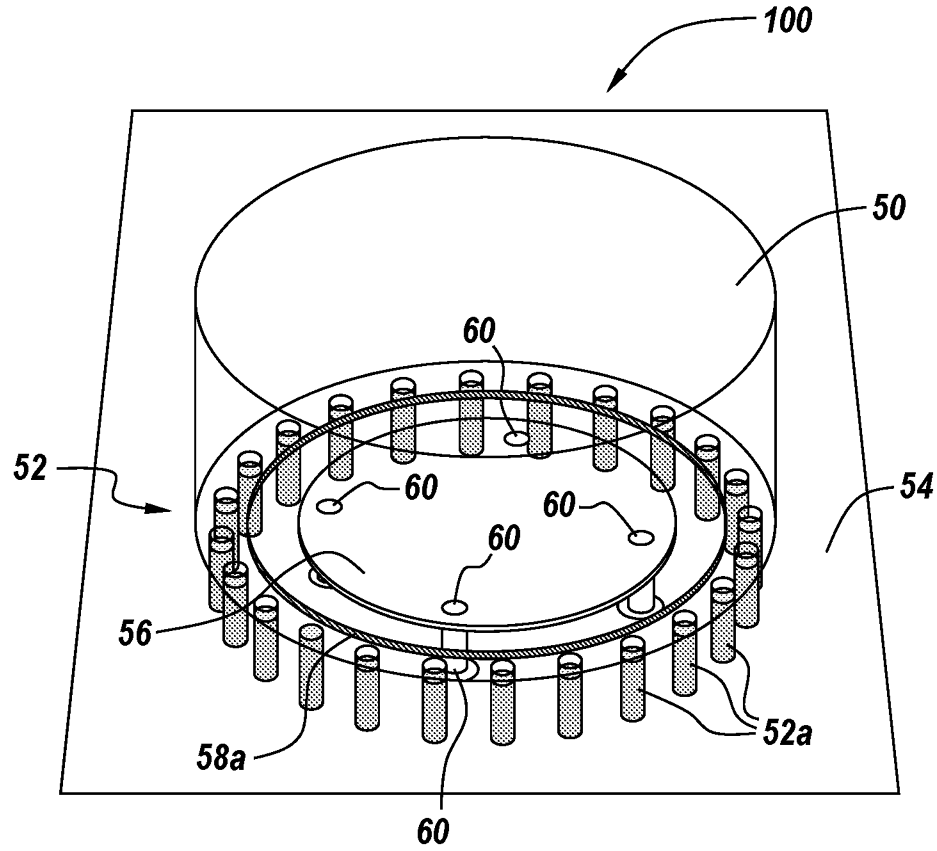
FIG. 5A is a perspective view of a dielectric resonator radiating element (DRRE) having a polymer-filled resonant cavity therein, according to an embodiment of the invention.
Figure 5B:
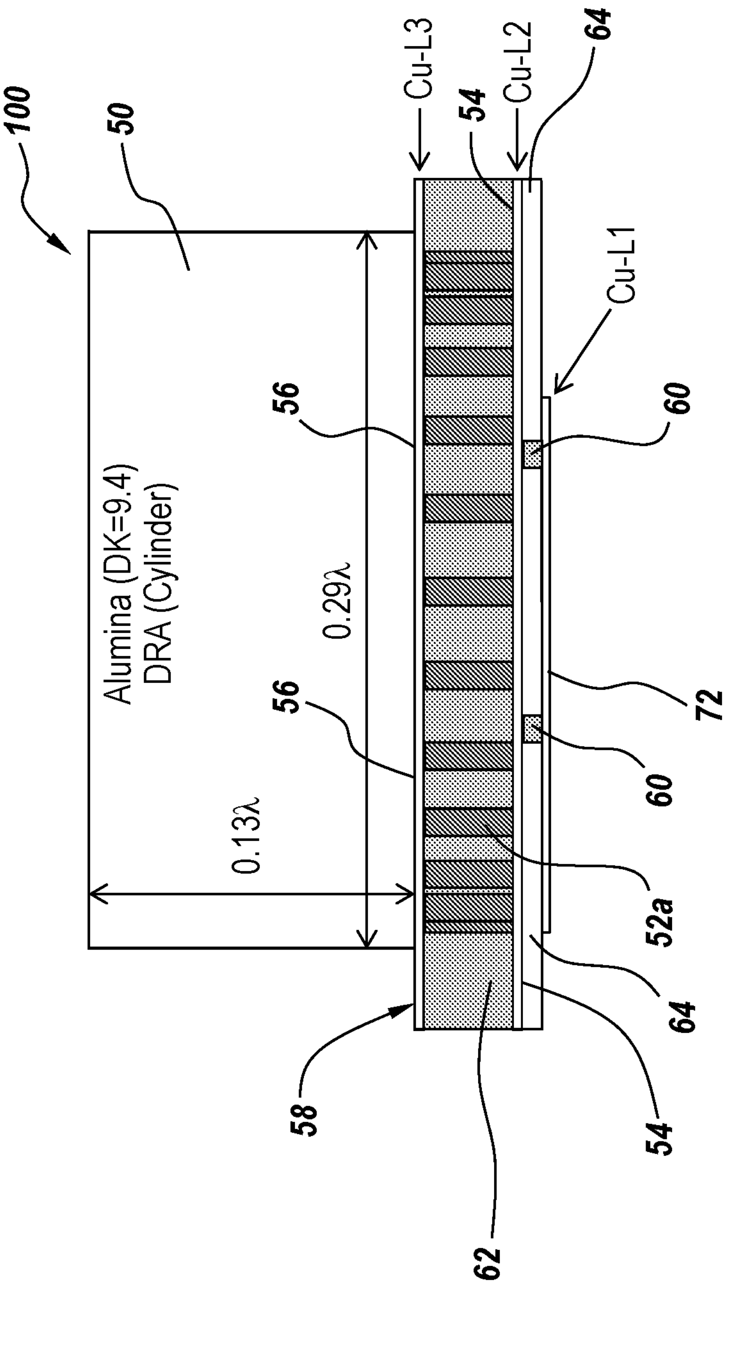
FIG. 5B is a cross-sectional view of the DRRE of FIG. 5A, according to an embodiment of the invention.
Figure 5C:
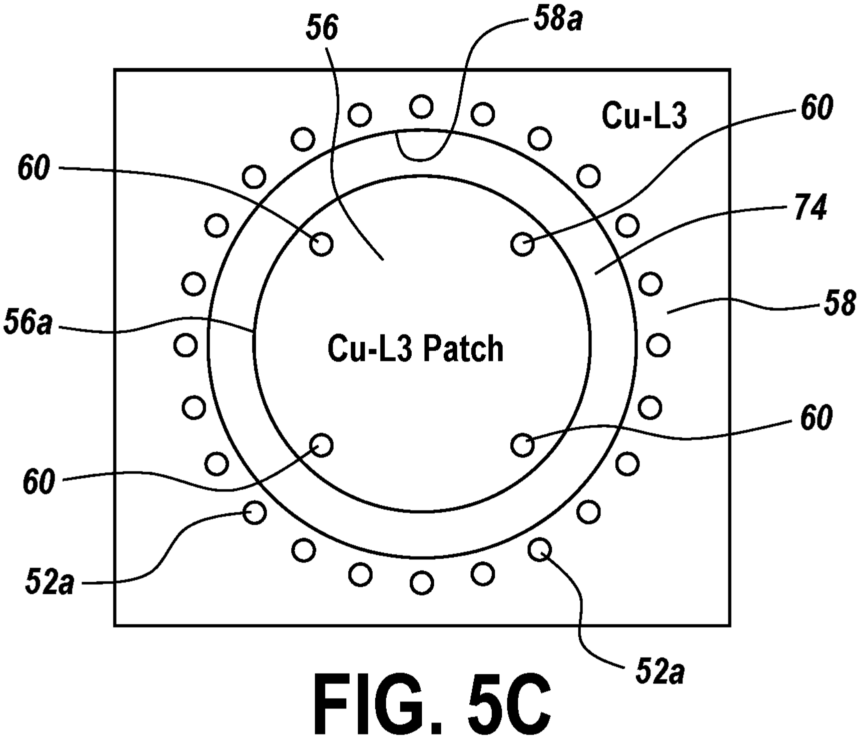
FIG. 5C is a plan view of a first metallization layer that defines a frontmost portion of a polymer-filled resonant cavity, according to an embodiment of the invention.

Referring now to FIGS. 5A-5E, a dielectric resonator radiating element (DRRE) 100 according to an embodiment of the invention may be utilized within an array of elements 100 to thereby function as a beam-forming dielectric resonator antenna (DRA), which is compatible in base station and other antenna applications. As illustrated by FIGS. 5A-5D, a cylindrically-shaped dielectric radiating element (DRE) 50 is provided, which is electromagnetically coupled through an annular-shaped slot 74 to an interior of a resonant cavity, which is responsive to (i.e., energized by) a plurality of radio frequency (RF) feed signals, as explained more fully hereinbelow. This annular-shaped slot 74 has a lateral width defined by an outer perimeter 56*a* of an electrically conductive (e.g., metal) circular patch radiator 56 (i.e., RF feeding patch) and an inner perimeter 58*a* of an electrically conductive ground plane 58 (GND). As shown by FIGS. 5A-5B, the resonant cavity is defined laterally by a circular-shaped ring 52 of spaced-apart electrically conductive vias (e.g., blind vias) 52*a*, which collectively define/approximate a metallized "side-wall" of the resonant cavity within a surrounding dielectric substrate material 62. This dielectric substrate material preferably has a dielectric constant less than a dielectric constant of the DRE 50. Each of these electrically conductive vias 52*a* in the ring 52 extends between and electrically connects together first and second parallel and metallized planes that define a frontmost metallized surface 58 and a rearmost metallized surface 54 of the resonant cavity, and are held at a fixed DC voltage (e.g., GND). These metallized surfaces 58 and 54 may be configured as patterned copper (Cu) layers (e.g., Cu-L3, Cu-L2) in some embodiments of the invention. As shown by FIGS. 5B and 5C, the circular patch radiator 56, which is coplanar with the frontmost metallized surface 58, may also be configured as a patterned copper layer (e.g., Cu-L3).

In some embodiments of the invention, the dielectric substrate material 62 filling the resonant cavity may be a polymer, such as polytetrafluoroethylene (PTFE) or another one of a wide variety of dielectric materials. A center-to-center spacing between the electrically conductive vias 52*a* in the ring 52 may be less than about $\lambda_s/8$ in some embodiments of the invention in order to achieve properties similar to a continuous, uninterrupted and cylindrically-shaped metal wall of the resonant cavity, where $\lambda_s$ is a wavelength corresponding to the center frequency of the plurality of RF feed signals in the polymer "substrate."

Figure 5D:
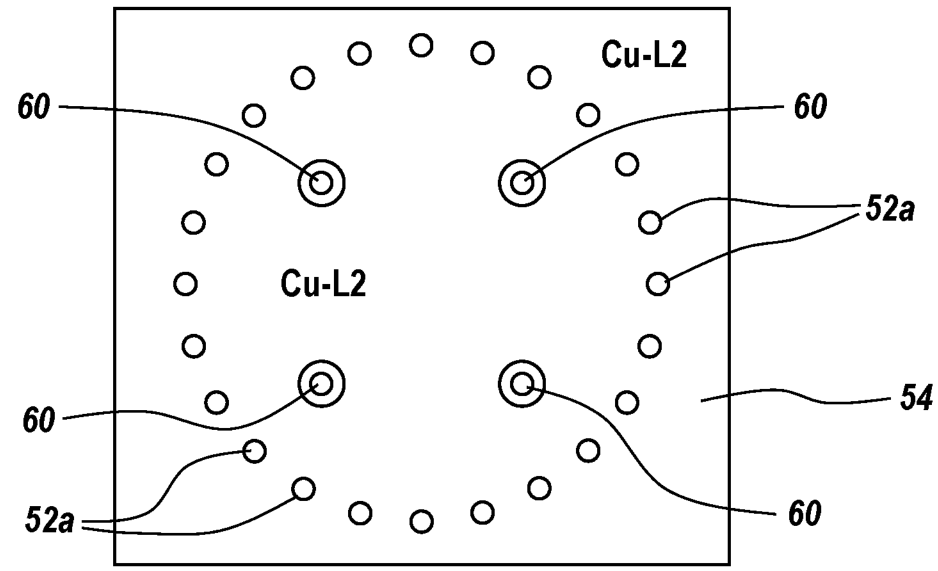
FIG. 5D is a plan view of a second metallization layer that defines a rearmost portion of a polymer-filled resonant cavity, according to an embodiment of the invention.
Figure 5E:
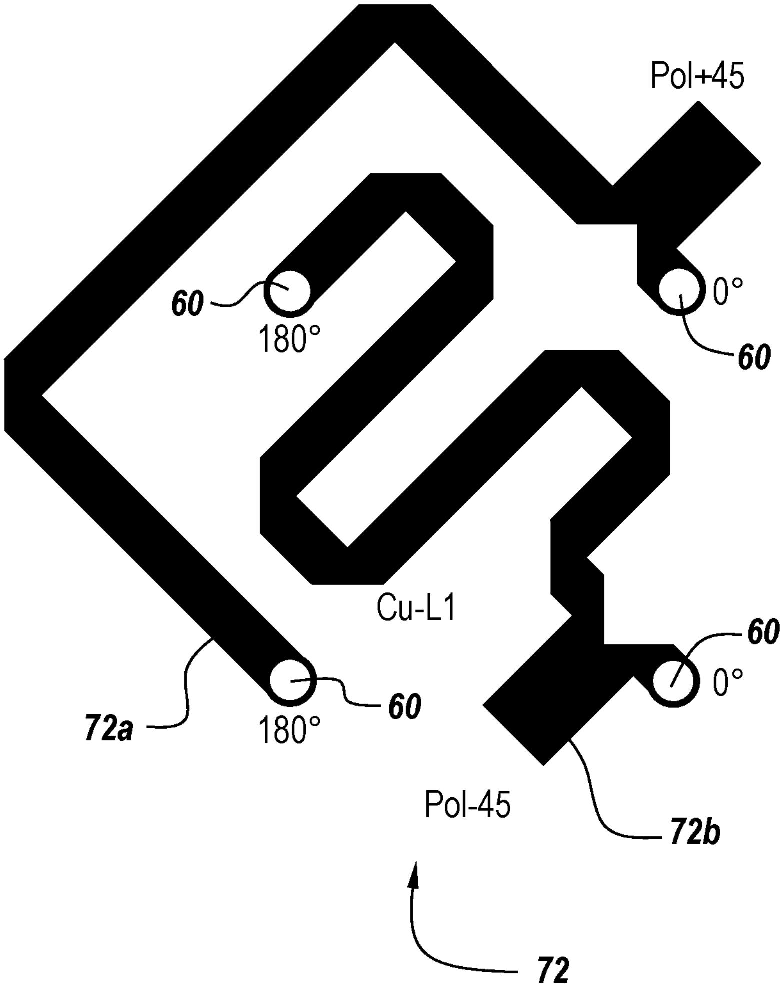
FIG. 5E is a plan view of a pair of patterned metallization traces within a cross-polarized feed network, according to an embodiment of the invention.

As illustrated best by FIG. 5B, the DRE 50 may be configured to have a thickness (i.e., height) of about 0.13λ, a diameter of about 0.29λ, and a dielectric constant of greater than about 4 (i.e., $\varepsilon_r>4$), where λ corresponds to a wavelength (in air) of a mid-band frequency of the RF feed signals provided to the DRRE 100. For example, in some embodiments of the invention, the DRE 50 may be configured as a solid alumina ($Al_2O_3$) cylinder having a dielectric constant of about 9.4, and λ may correspond to a mid-band frequency of about 3.55 GHz for a band spanning 3.3 GHz-3.8 GHz. Referring now to FIGS. 5B and 5D-5E, the rearmost metallized surface 54 of the resonant cavity may be provided as a frontmost and patterned metallized surface 54 of a dual-sided printed circuit board 64 (PCB), upon which the resonant cavity, the dielectric substrate 62 and the DRE 50 are supported. In addition, a rearmost metallized surface 72 of the PCB 64 may be provided as a pair of microstrip Cu traces 72*a*, 72*b* (e.g., Cu-L1), which are patterned to thereby generate four cross-polarized RF feed signals (Pol+45 (0°, 180°), Pol−45 (0°, 180°)) from a pair of cross-polarized RF input feed signals (Pol+45, Pol−45). As shown best by FIG. 5B, these four cross-polarized RF feed signals are provided to the resonant cavity and to respective "corners" of the circular patch radiator 56, via four plated through-holes 60. These plated through-holes 60 extend through the PCB 64 and through the dielectric substrate 62 within the resonant cavity, but are electrically isolated from the frontmost metallized surface 54 of the PCB 64 (see FIG. 5D), which operates as a ground plane (GND) and as a bottom of the resonant cavity.

Figure 6:
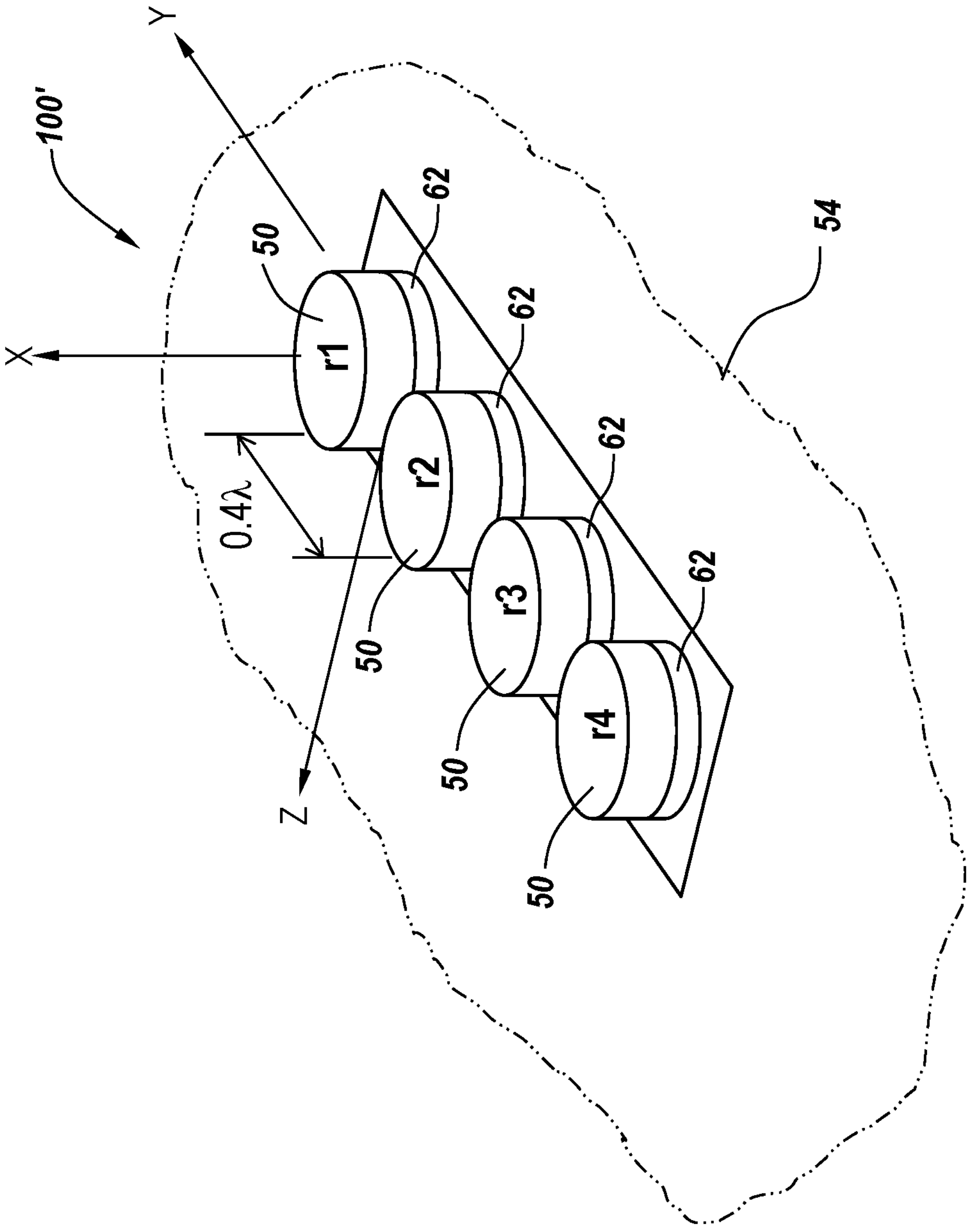
FIG. 6 is a perspective view of a linear array of the DRREs of FIGS. 5A-5E, according to an embodiment of the invention.

Moreover, as illustrated by FIG. 6, a linear array 100' of the dielectric resonator radiating elements (DRRE) 100 of FIGS. 5A-5E, which are illustrated as dielectric resonators r1-r4, may be provided on the metallized "ground plane" surface 54 of a PCB 64, with a resonator-to-resonator pitch of 0.4λ on a ground plane of at least 2.4λ×4.4λ. And, in some further embodiments of the invention, multiple linear arrays 100' may be provided to define a beam forming antenna array.

Referring now to FIGS. 7A-7F, a dielectric resonator radiating element (DRRE) 200 according to another embodiment of the invention includes a single (or multi-piece) dome-shaped dielectric radiating element (DRE) 50', which is electromagnetically coupled to an interior of a partially metallized polymer disc 210, which operates as a polymer-filled resonant cavity for RF feed signals generated by a cross-polarized feed network 230.

Figure 7A:
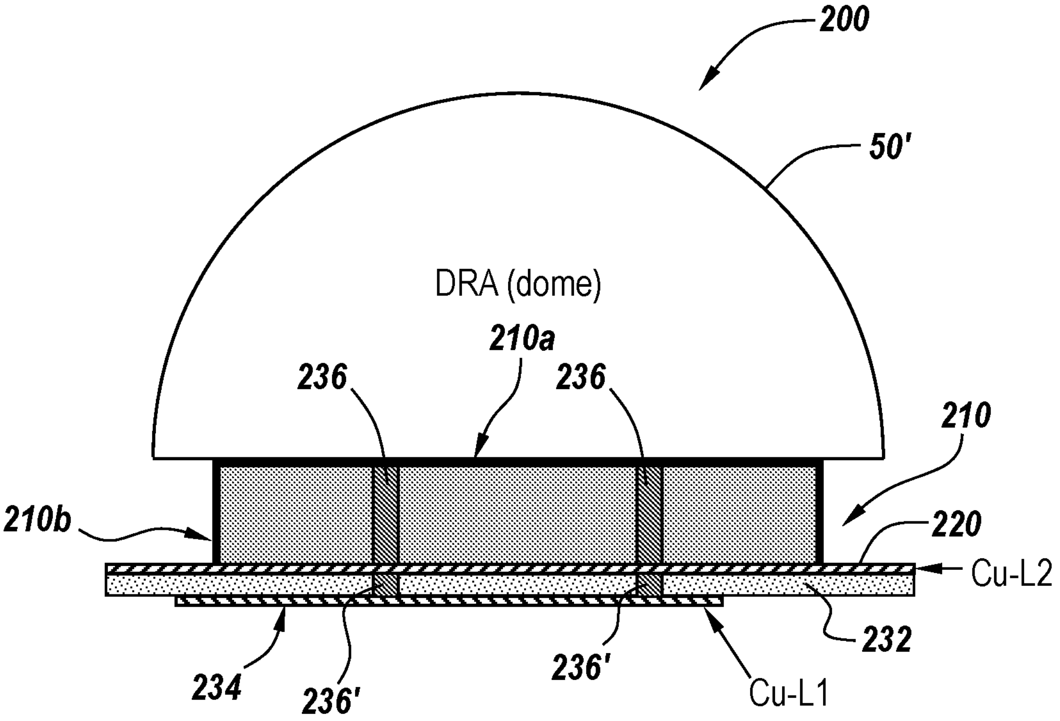
FIG. 7A is a side view of a dome-shaped dielectric resonator radiating element (DRRE) having a polymer-filled resonant cavity therein, according to an embodiment of the invention.
Figure 7B:
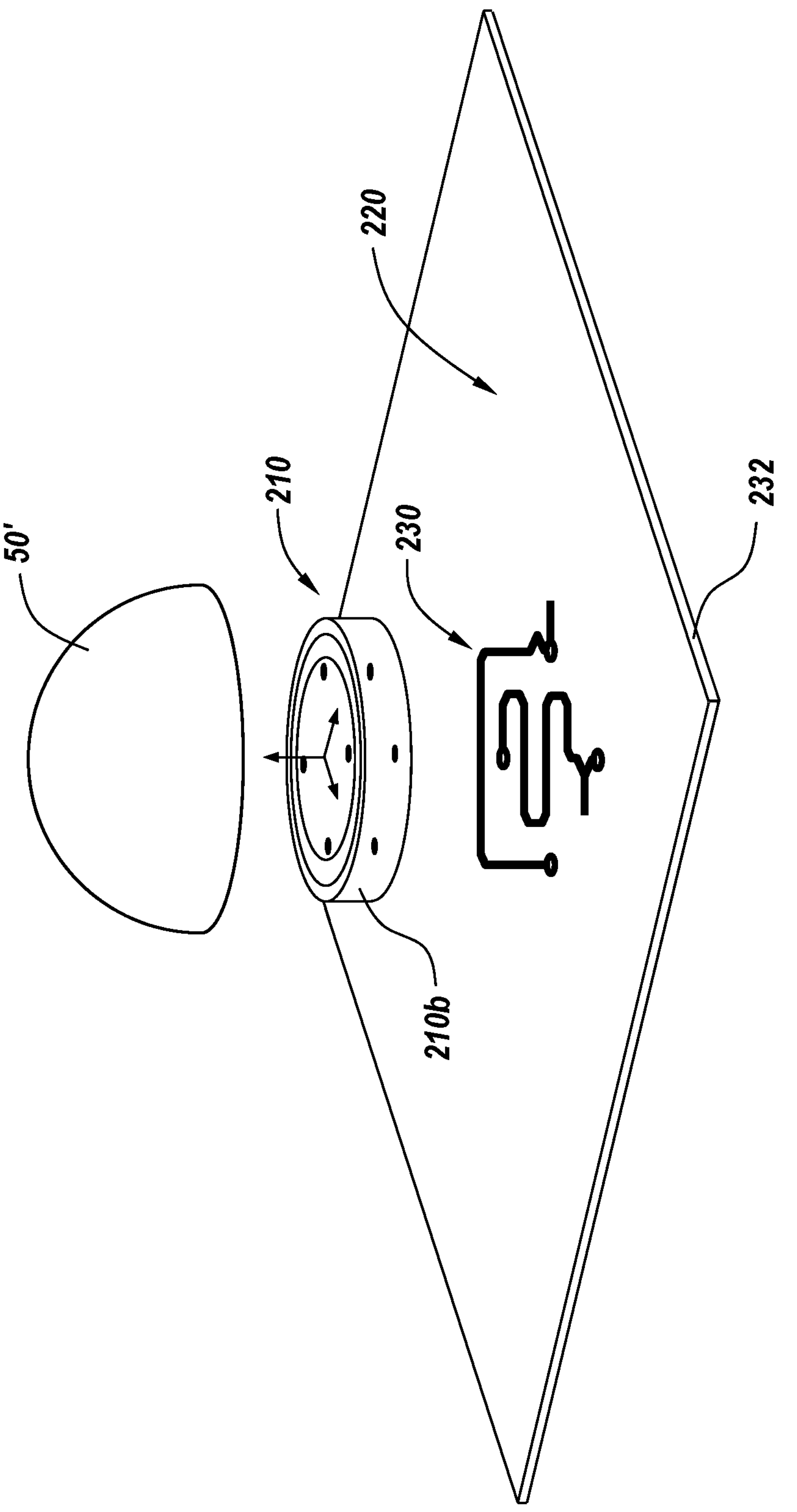
FIG. 7B is an exploded perspective view of the DRRE of FIG. 7A.
Figure 7C:
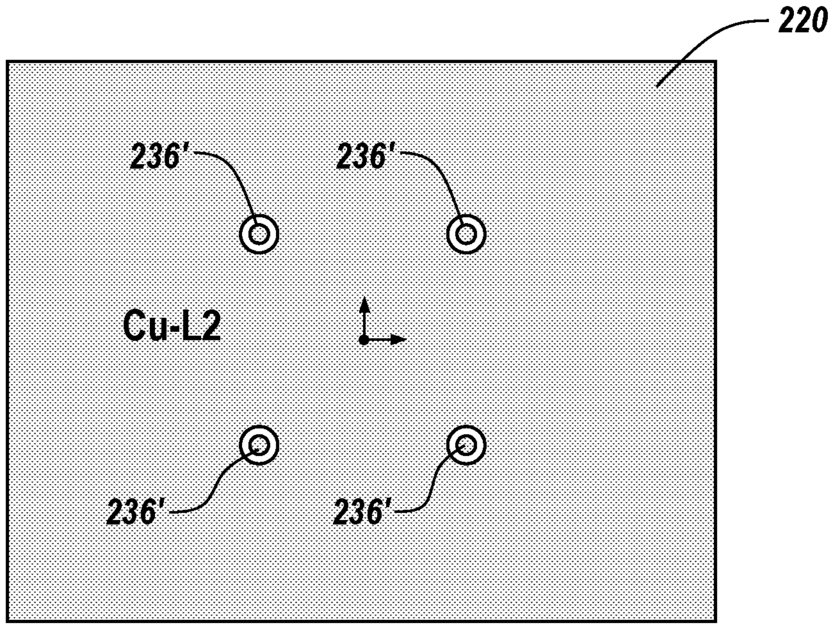
FIG. 7C is a plan view of a front surface of a printed circuit board that supports a cross-polarized feed network, as illustrated by FIG. 7A.
Figure 7D:
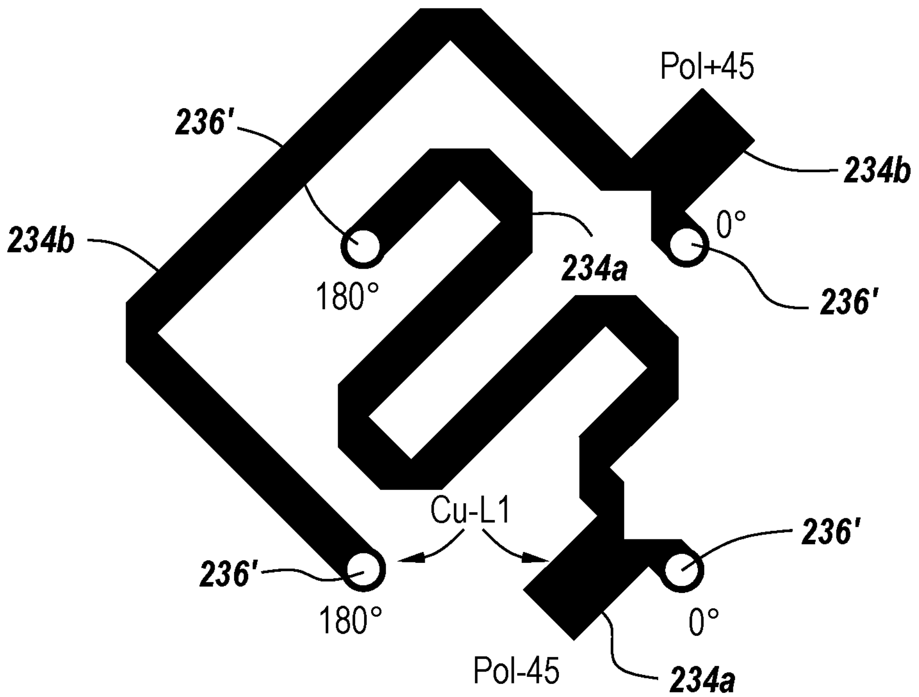
FIG. 7D is a plan view of a rear surface of the printed circuit board of FIGS. 7A and 7C, according to an embodiment of the invention.
Figure 7E:
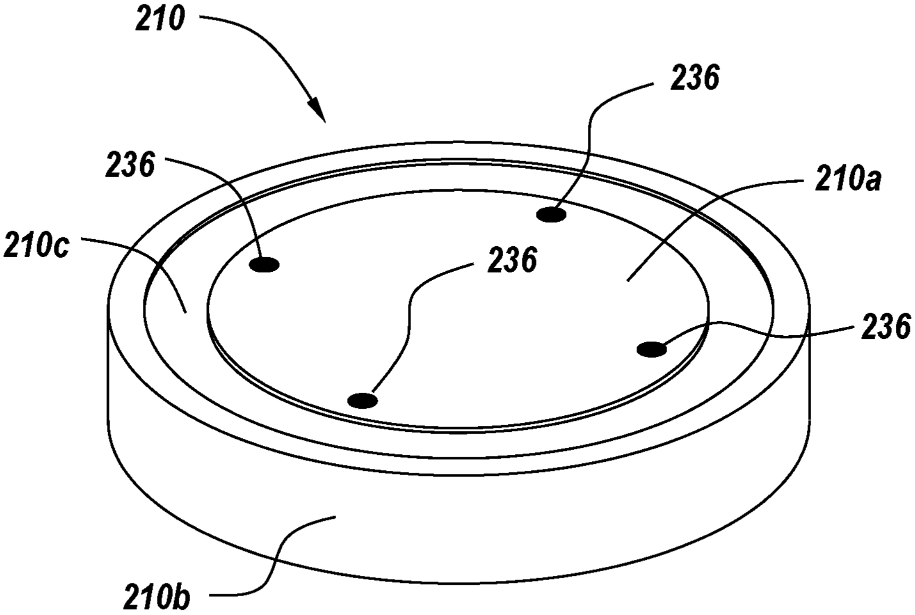
FIG. 7E is a side perspective view of a metallized polymer disc that may be utilized as a resonant cavity in the DRRE of FIG. 7A, according to an embodiment of the invention.
Figure 7F:
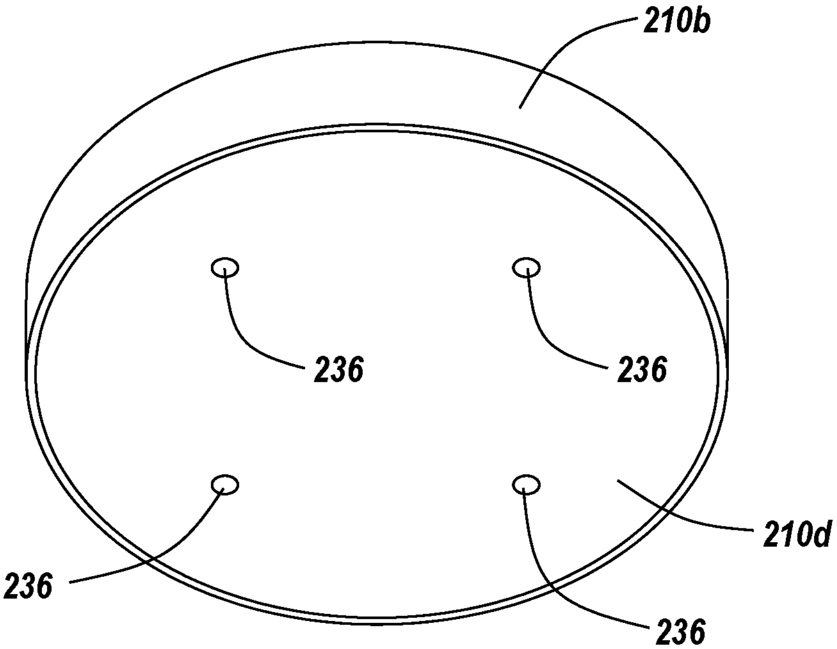
FIG. 7F is a rear perspective view of the metallized polymer disc of FIG. 7E.

As shown by FIGS. 7A-7B and 7E-7F, the polymer disc 210 may be configured as a polytetrafluoroethylene (PTFE) disc having a circular metal patch radiator 210*a* on a front-facing surface thereof. The polymer disc 210 also includes an uninterrupted metallized sidewall 210*b*, which extends onto the front-facing surface and defines a circular-shaped metal rim, which is separated from the patch radiator 210*a* by an annular-shaped slot 210*c*. As shown by FIG. 7F, a rear-facing surface 210*d* of the polymer disc 210 is preferably free of metallization. Nonetheless, a plurality of plated through-holes 236 are provided, which extend through the polymer disc 210, from the rear-facing surface 210*d* to the patch radiator 210*a*. These plated through-holes 236 support the transfer of a pair of cross-polarized RF feed signals through the polymer-filled resonant cavity to the patch radiator 210*a*.

As shown by FIGS. 7A-7D, these RF feed signals are generated by a cross-polarized feed network 230, which may be configured as a printed circuit board (PCB) 232 with dual-sided copper (Cu) metallization (i.e., Cu-L1, Cu-L2). This PCB 232 includes a front-facing metallized surface 220 (e.g., GND plane), which contacts the rear-facing surface 210*d* of the polymer disc 210. The PCB 232 also includes patterned metallization 234 on a rear-facing surface thereof, which includes first and second metal traces 234*a*, 234*b*. As shown by FIGS. 7A and 7C-7D, the first metal trace 234*a* is patterned and dimensioned to generate two RF feed signals (i.e., Pol−45 (0°, 180°)) derived from a first input feed signal (Pol−45), and the second metal trace 234*b* is patterned and dimensioned to generate two RF feed signals (i.e., Pol+45 (0°, 180°)) derived from a second input feed signal (Pol+45). These first and second pairs of RF feed signals are provided to plated through-holes 236' within the PCB 232, which are aligned to and contact corresponding plated through-holes 236 in the polymer disc 210. Based on this configuration, the first and second pairs of RF feed signals are provided, without interruption, through the polymer-filled resonant cavity and to the patch radiator 210*a* to thereby support patch mode resonance. In addition, the patch radiator 210*a* is electromagnetically coupled to the polymer-filled interior of the resonant cavity and through the annular-slot 210*c* to the DRE 50' to thereby support TE111 mode resonance (i.e., dielectric radiator (DR) resonance) within the DRE 50', which is combined with the patch mode resonance.

Figure 8A:
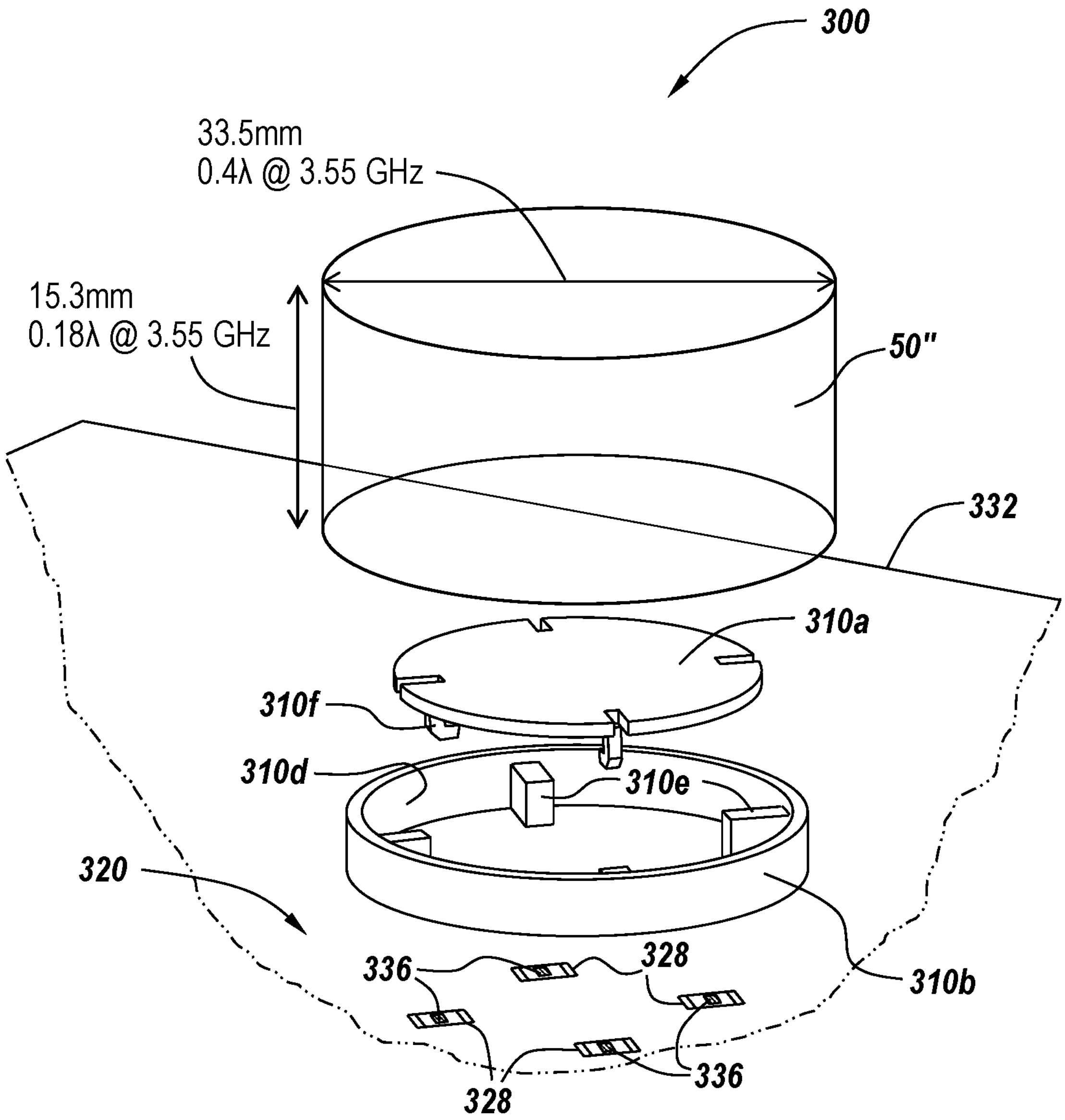
FIG. 8A is an exploded perspective view of a dielectric resonator radiating element (DRRE), according to embodiments of the invention.
Figure 8B:
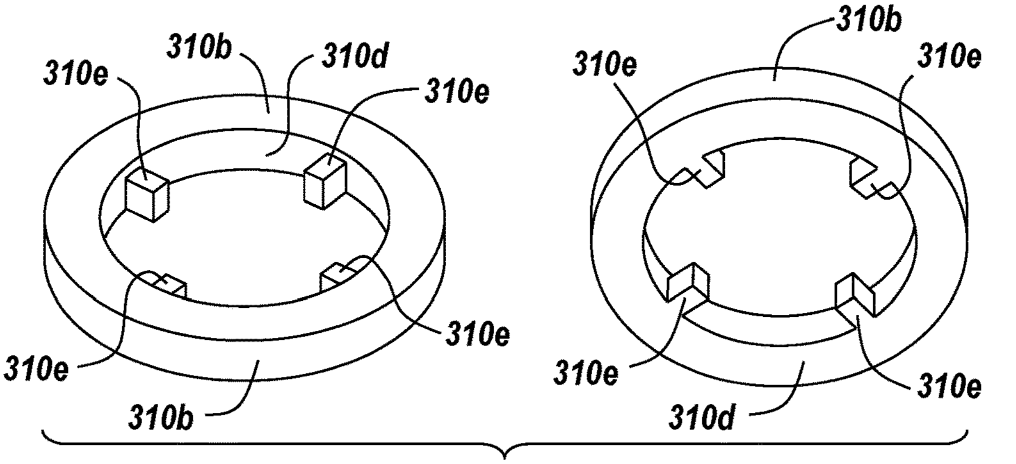
FIGS. 8B-8E are perspective views of components of the DRRE of FIG. 8A, according to embodiments of the invention.
Figure 8C:
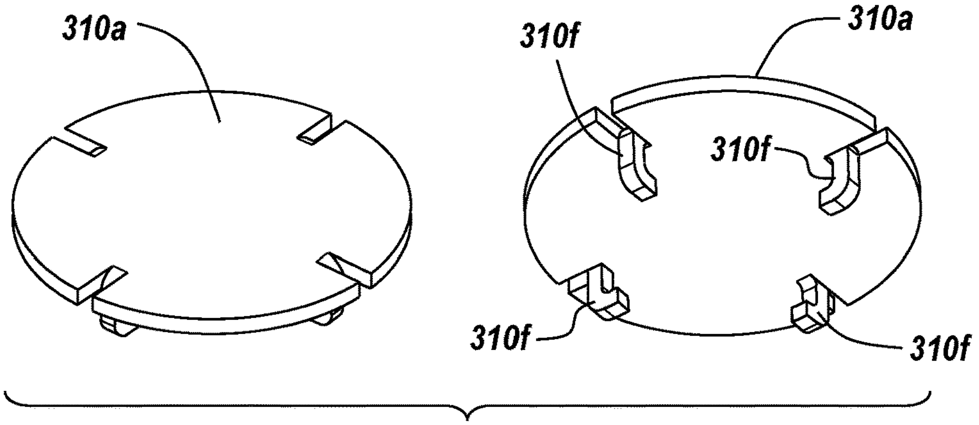
Figure 8D:
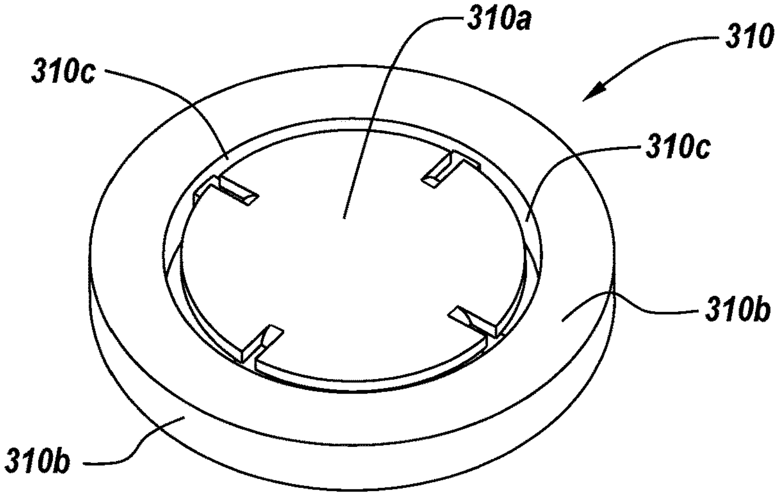
Figure 8E:
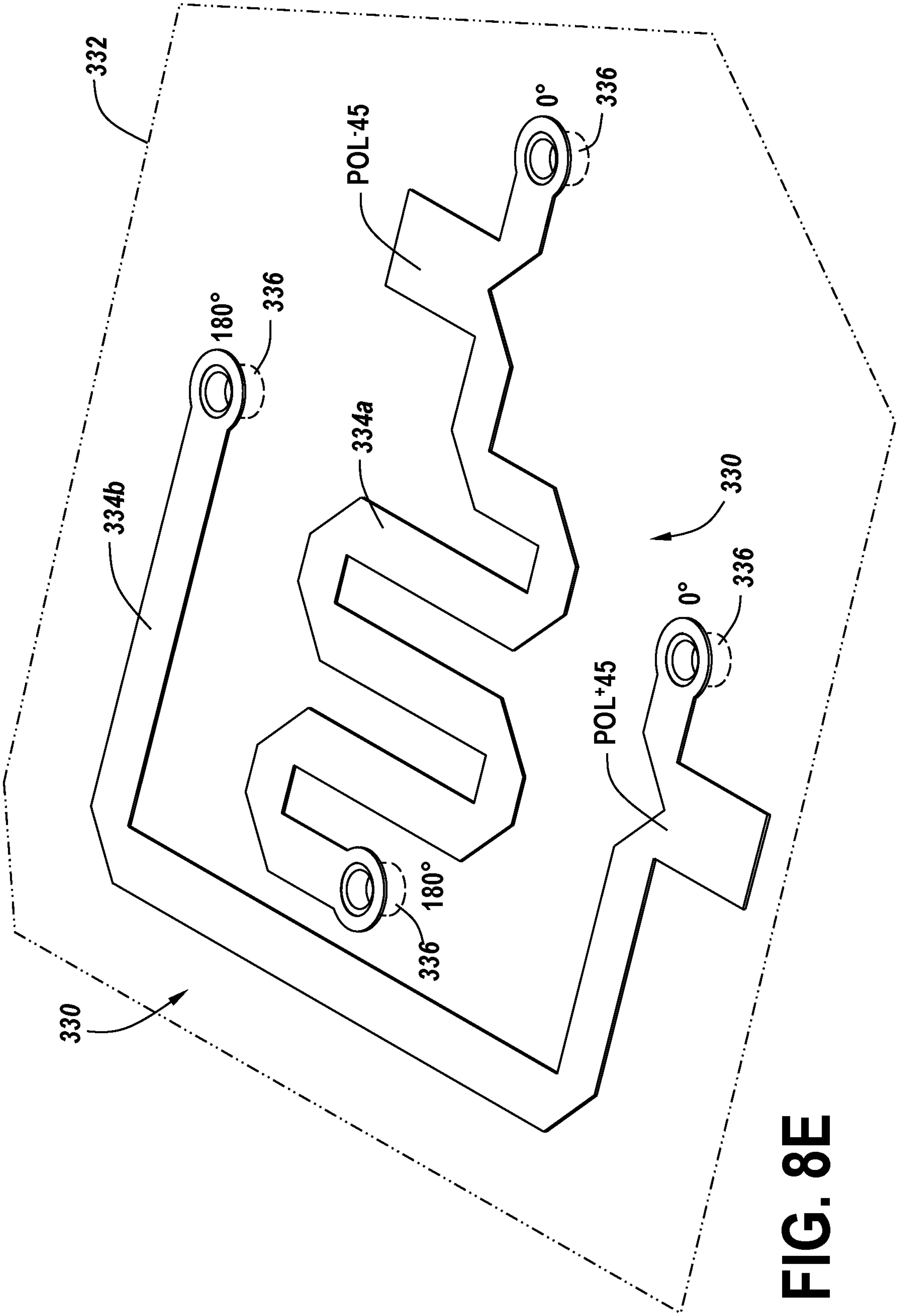

Similarly, as illustrated by FIGS. 8A-8E and 9, a dielectric resonator radiating element (DRRE) 300 according to another embodiment of the invention includes a cylindrically-shaped dielectric radiating element (DRE) 50", which is electromagnetically coupled to an interior of a partially metallized polymer disc 310, which can include an air-filled resonant cavity 342 (FIG. 9) for RF feed signals generated by a cross-polarized feed network 330 (FIG. 8E). In particular, the exploded perspective view of FIG. 8A illustrates a stack of components associated with the DRRE 300. This stack includes a single or multi-piece DRE 50", which, when assembled, is directly affixed to a front facing and primary surface of a circular patch radiator 310*a* and a front facing metallized circular rim of a metallized sidewall 310*b* (a/k/a metallized side fence), which are separated from each other by an annular-shaped slot 310*c* (FIG. 8D). As described more fully hereinbelow with respect to FIGS. 8B-8D, the metallized sidewall 310*b* (of a polymer ring 310*d*) and the patch radiator 310*a* collectively define a metallized polymer-backed "radiating" disc 310 containing an at least partially air-filled resonant cavity therein.

In the embodiment of FIG. 8A, the DRE 50" is illustrated as having a net thickness (i.e., height) of about 0.18λ, a diameter of about 0.4λ, and a dielectric constant of greater than about 4, where λ corresponds to a wavelength (in air) of a mid-band frequency (e.g., 3.55 GHz) of the RF feed signals provided to the DRRE 50". In some embodiments of the invention, the DRE 50" and the polymer ring 310*d* may be formed of a dielectric material containing Kalix 9950 Polyamide (i.e., nylon) having a dielectric constant ($\varepsilon_r$) of about 4.15; and, the circular patch radiator 310*a* may be formed (e.g., stamp printed) from a 1 mm thick metal plate.

As shown, an underside "polymer" surface of the partially metallized polymer ring 310*d* is mounted in direct contact with a metallized front surface 320 (e.g., GND plane) of a printed circuit board (PCB) 332, and is aligned to a quad-arrangement of electrically conductive contact pads 328 (e.g., solder pads), which are electrically connected to respective ones of a plurality of electrically conductive/filled through-substrate vias 336, as shown more fully by FIG. 8E. This alignment and mounting is provided by an initial press fit between: (i) a quad-arrangement of polymer extensions 310*e*, which extend inwardly from an interior sidewall of the polymer ring 310*d*, as shown best by FIGS. 8A-8B, and (ii) a corresponding quad-arrangement of through-cavity vertical contacts 310*f*, as shown best by FIGS. 8A and 8C.

In some embodiments of the invention, the vertical contacts 310*f* may be defined as rearwardly extending "stamped" projections of the front facing surface of the circular patch radiator 310*a*. During mounting, distal ends of these vertical contacts 310*f* are soldered to respective contact pads 328, after the patch radiator 310*a* is initially aligned and press fit within the polymer ring 310*d* to thereby define the metallized radiating disc 310, as illustrated FIG. 8D. In particular, upon press fit, the metallized radiating disc 310 may be treated as a surface mount device (SMD), which is capable of undergoing a conventional solder reflow process to secure electrical contact with the contact pads 328.

Based on this configuration, the vertical contacts 310*f* support the transfer of two-pairs of RF feed signals from the cross-polarized feed network 330, and through the air-filled cavity, which is defined by the interior sidewall of the polymer ring 310*d* and a rear surface of the patch radiator 310*a*. These RF feed signals are then received at respective "corners" of the front facing surface of the patch radiator 310*a*, which directly abuts the DRE 50".

Referring again to FIG. 8E, the cross-polarized feed network 330 includes first and second metal traces 334*a*, 334*b*, which are patterned on a rear side of the printed circuit board 332. The first metal trace 334*a* is patterned and dimensioned to generate two out-of-phase RF feed signals (e.g., Pol−45 (0°, 180°)) derived from a first input feed signal (Pol−45), and the second metal trace 334*b* is patterned and dimensioned to generate two out-of-phase RF feed signals (i.e., Pol+45 (0°, 180°)) derived from a second input feed signal (Pol+45). As shown, these first and second pairs of RF feed signals are provided to plated through-substrate vias 336 within the PCB 332, which are electrically coupled to respective ones of the contact pads 328 and respective ones of the vertical contacts 310*f*, which traverse the air-filled cavity 342.

Figure 9:
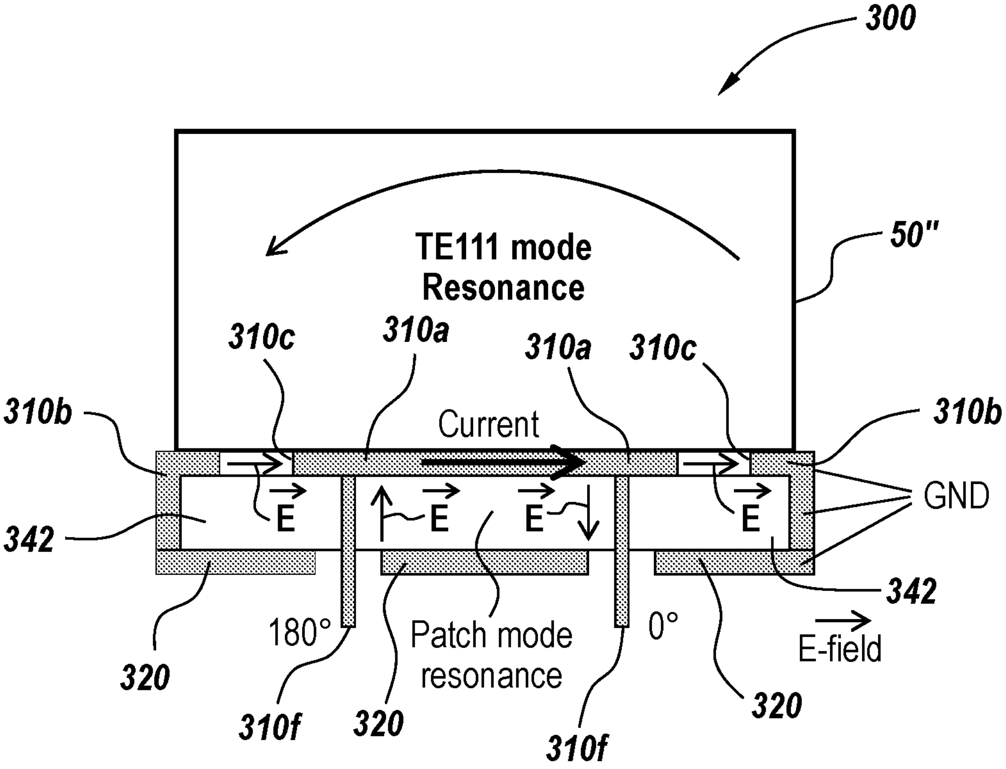
FIG. 9 is a schematic cross-sectional view of the DRRE of FIGS. 8A-8E, which illustrates concurrent patch mode and TE111 mode resonance, according to an embodiment of the invention.

Although not wishing to be bound by any theory and as illustrated by a schematic representation of the DRRE 300 of FIG. 9, each pair of these RF feed signals supports concurrent: (i) patch mode resonance within the air-filled cavity 342, which is supported by the vertical E-fields across the cavity 342, and (ii) TE111 mode resonance within the DRE 50", which is supported by the horizontal E-fields established across the annular-shaped slot 310*c* extending between the patch radiator 310*a* and the metallized sidewall 310*b* of the polymer-backed disc 310.

Figure 10:
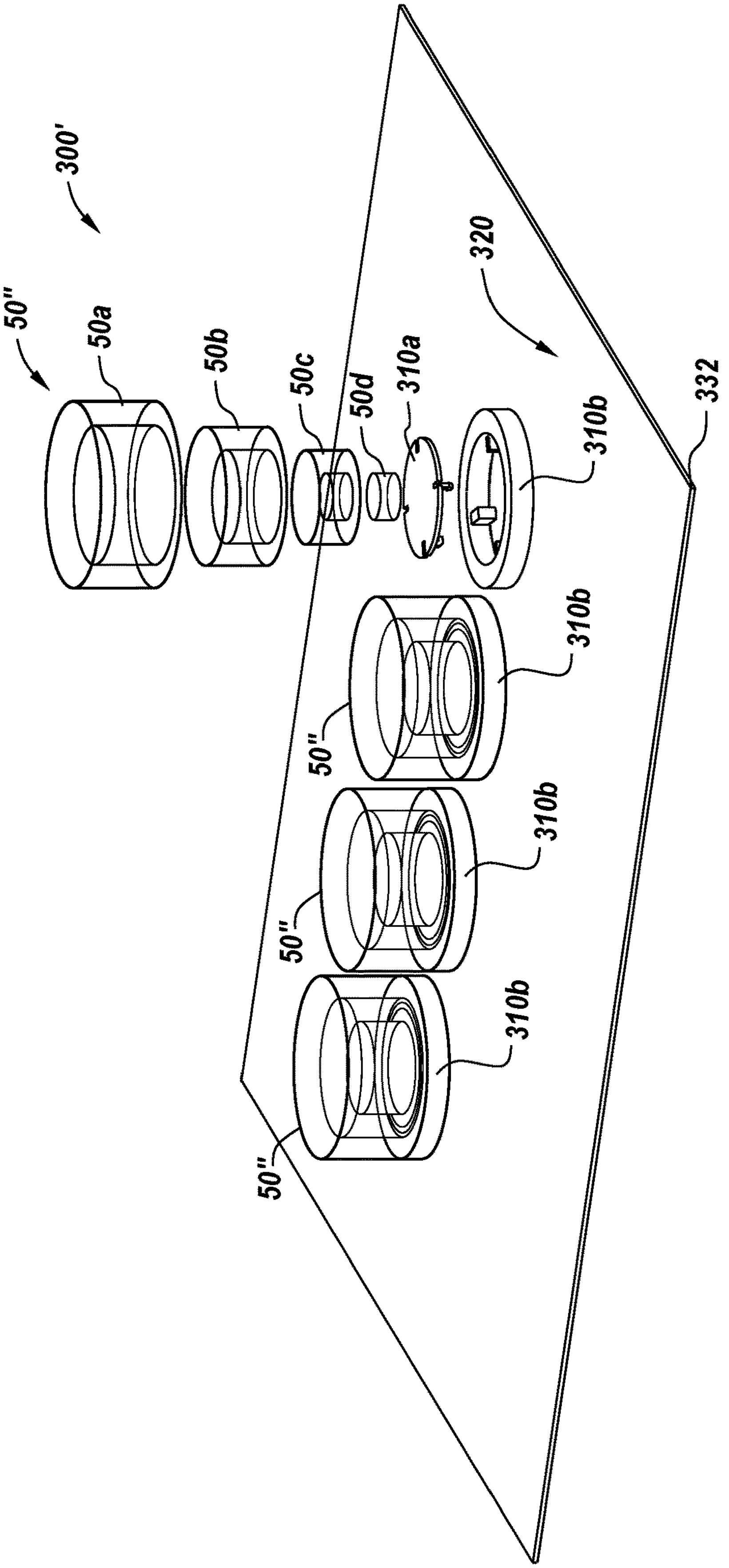
FIG. 10 is a perspective view on a linear array of the DRREs of FIGS. 8A-8E, according to an embodiment of the invention.

Finally, as illustrated by the perspective view of FIG. 10, a DRRE 300' according to another embodiment of the invention can utilize a plurality of DREs 50", which are affixed to a linear array of polymer-backed discs 310 that are mounted on the metallized front surface 320 of a printed circuit board 332. As shown, each of DREs 50" is assembled as a nested arrangement of dielectric radiating sub-elements 50*a*-50*d*, which may be independently formed using injection-molded fabrication techniques. As shown by FIG. 10, a solid and relatively small cylindrically-shaped sub-element 50*d* may be formed as an injection-molded sub-element, which is press-fit within a next larger annular-shaped sub-element 50*c*, which itself is press-fit within sub-element 50*b*. The nested combination of sub-elements 50*b*-50*d* is then press-fit within the largest diameter sub-element 50*a* to thereby define a solid DRE 50" having a cylindrical shape (as shown) or another shape (e.g., dome shaped), for example. In addition, according to further embodiments of the invention, the solid DRE 50" may be formed from solid sub-elements 50*a*-50*d* having different material characteristics, which are characterized by different dielectric strengths, in order to potentially support wider bandwidth operation. And, in still further embodiments of the invention, one or more cavities (e.g., air-filled) may be provided within a DRE 50" to thereby potentially support wider bandwidth operation.

Figure 11A:
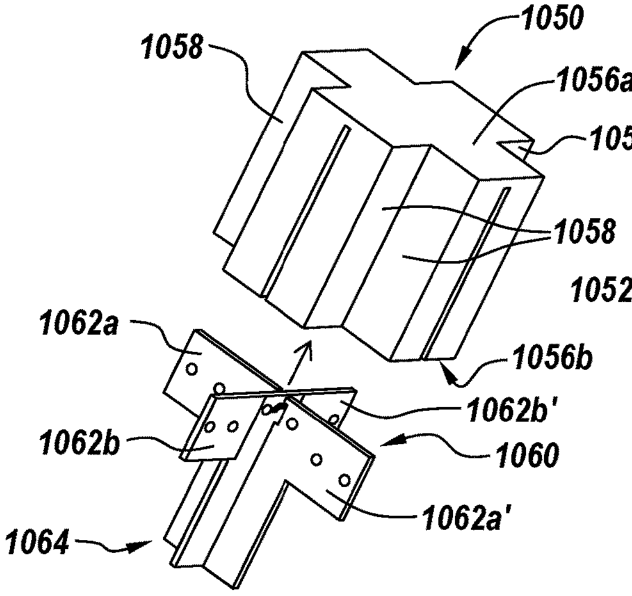
FIG. 11A is a first perspective "exploded" view of the components of a dielectric resonator antenna (DRA) according to an embodiment of the invention, which includes a cross-shaped dielectric block having a plurality of slots therein and a cross-dipole radiating element (CDE) that operates as a dielectric-loaded CDE when inserted within the plurality of slots in the dielectric block.
Figure 11B:
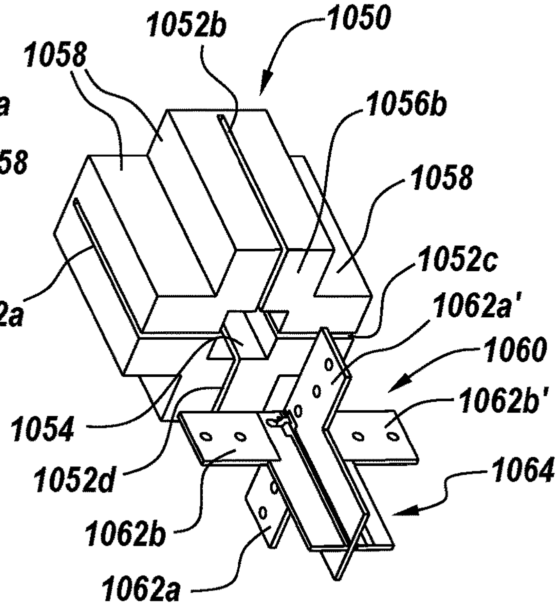
FIG. 11B is a second perspective "exploded" view of the components of a dielectric resonator antenna (DRA) according to an embodiment of the invention, which includes a cross-shaped dielectric block having a plurality of slots and a rectangular-shaped cavity therein and a cross-dipole radiating element (CDE) that operates as a dielectric-loaded CDE when inserted within the plurality of slots and the rectangular-shaped cavity in the dielectric block.
Figure 11C:
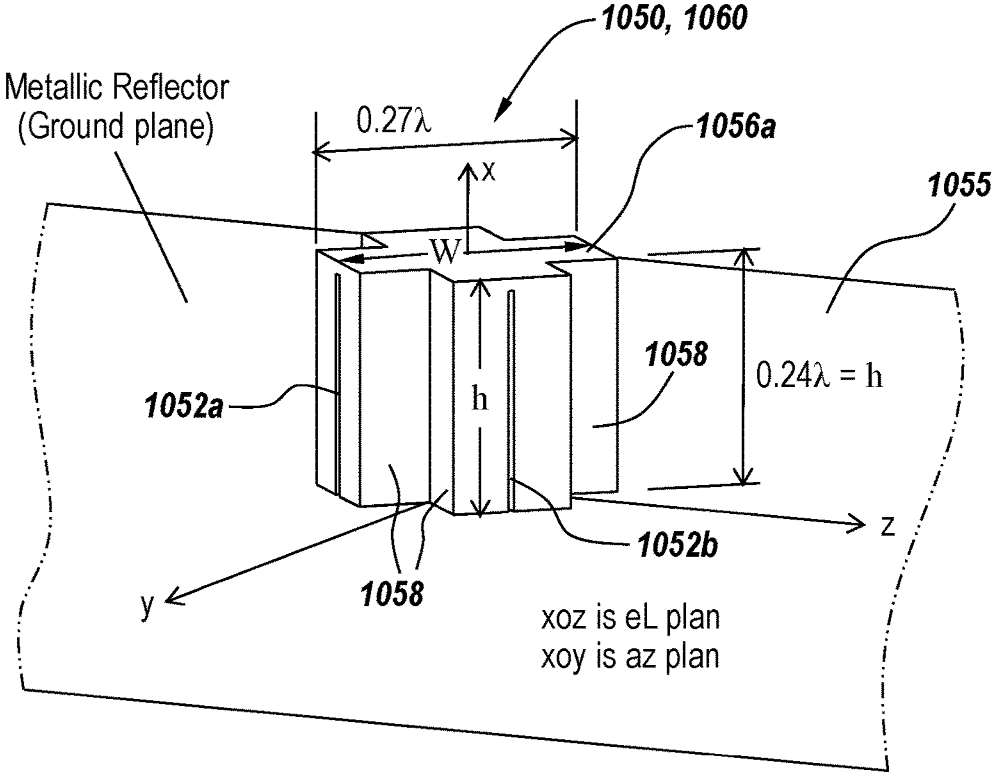
FIG. 11C is a third perspective view of an assembled cross-shaped dielectric resonator antenna (DRA) on a ground plane reflector, according to an embodiment of the invention.

Referring now to the "exploded" views of FIGS. 11A-11B, a dielectric resonator antenna (DRA) according to an embodiment of the invention is illustrated as including a cross-shaped and unitary dielectric block 1050 and a cross-dipole radiating element (CDE) 1060, which may be fully embedded within the cross-shaped dielectric block 1050 when mounted on a reflector 1055, as illustrated by FIG. 11C. As shown, the cross-shaped and unitary dielectric block 1050 includes a cross-shaped, planar and forward-facing surface 1056*a* having a width "w" (e.g., w≈0.27λ), and a reflector-facing "rear" surface 1056*b*, which is defined by four (4) substantially L-shaped segments, where λ corresponds to a wavelength (in air) of a mid-band radio frequency (RF) signal associated with the DRA. These L-shaped segments are each defined by respective pairs of exterior sidewalls 1058 and a rectangular-shaped interior cavity 1054 having a longitudinal axis aligned to a center axis (e.g., x-axis) of the cross-shaped dielectric block 1050. The cross-shaped and unitary dielectric block 1050 further includes a first pair of coplanar slots 1052*a*, 1052*c* and a second pair of coplanar slots 1052*b*, 1052*d*, which extend orthogonally relative to the first pair of coplanar slots 1052*a*, 1052*c*. These slots 1052*a*-1052*d* extend from the rear surface 1056*b* through a majority of the height "h" of the cross-shaped dielectric block 1050, as measured along the x-axis (e.g., h≈0.24λ) and illustrated by FIG. 11C. Likewise, the cavity 1054 may also extend through a majority of the height "h" of the cross-shaped and unitary dielectric block 1050.

As further shown by FIGS. 11A-11B, the CDE 1060 may include a first pair of radiator dipole arms 1062*a*, 1062*a*' defined as patterned metallization on a first dual-sided printed circuit board (PCB) and a second pair of radiator dipole arms 1062*b*, 1062*b*' defined as patterned metallization on a second dual-sided PCB. When mounted together in an orthogonal relationship, these first and second PCBs may further define a feed stalk 1064, which is configured to be mounted on and receive radio frequency (RF) feed signals through apertures in the reflector 1055.

Figure 4:
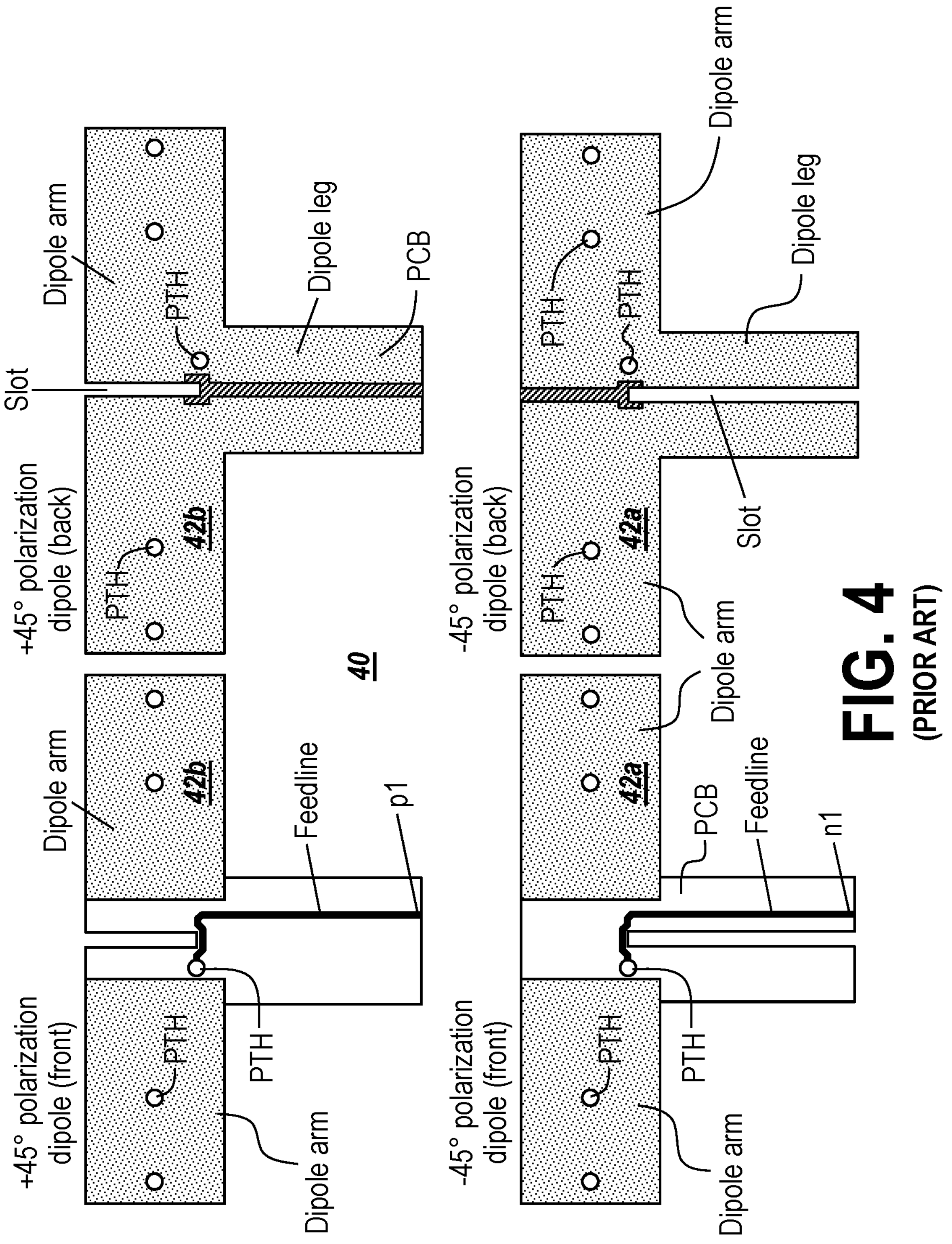
FIG. 4 (PRIOR ART)
FIG. 4 illustrates front and back side views of a pair of conventional printed circuit boards (PCBs) with patterned metallization thereon, which operate as a cross-dipole radiating element (CDE) with ±45° dual-polarization when coupled together.
Figure 12:
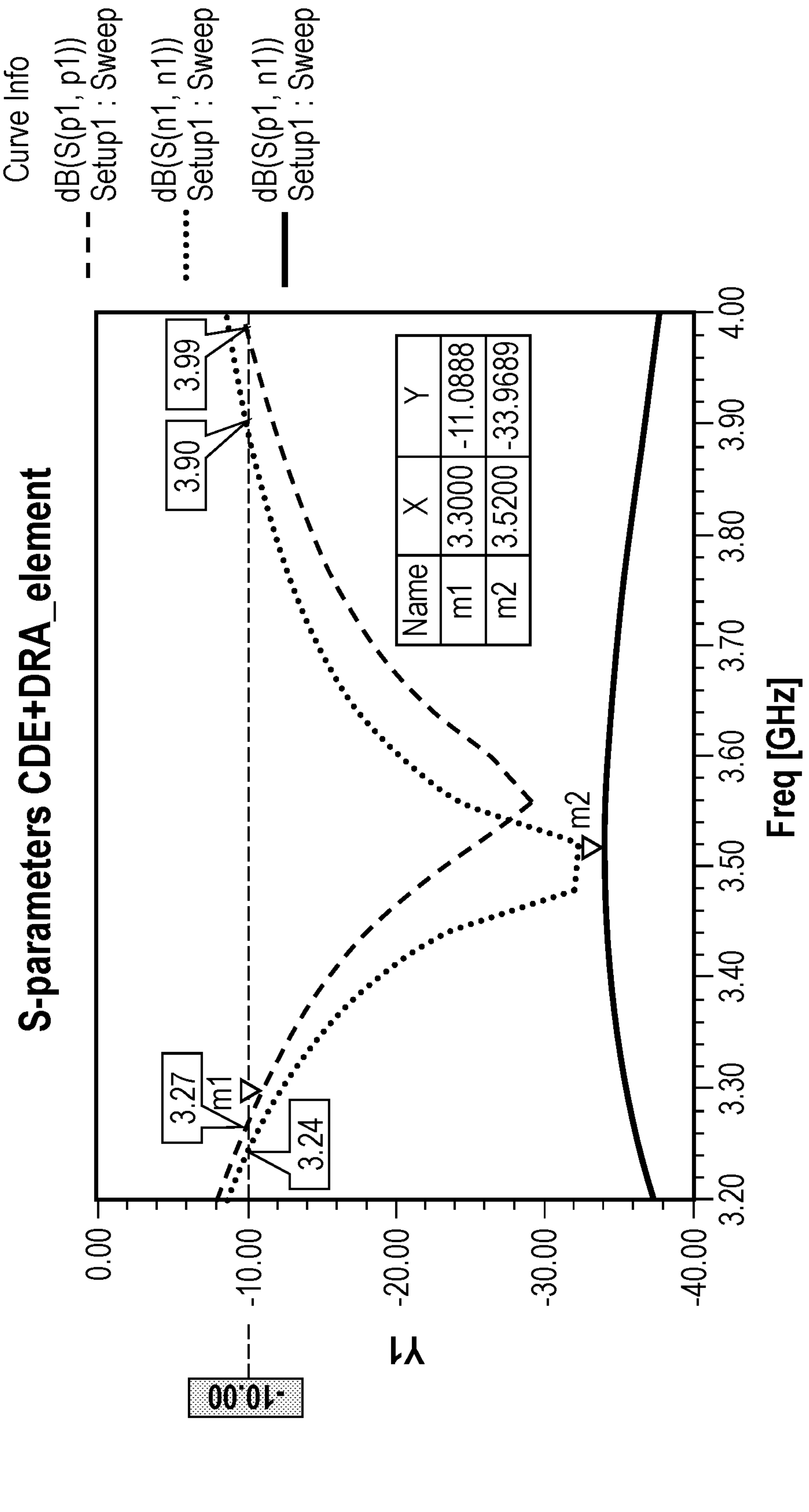
FIG. 12 is a graph illustrating the S-parameters associated with the DRA of FIGS. 11A-11C, which illustrates: (i) a worst return loss (RL) among Sp1, p1 & Sn1, n1 throughout the system band (approximately 3.3 to 3.8 GHz) of less than −11 dB, (ii) a worst self-isolation (ISO=Sp1, n1) of less than −33.9 dB, and (iii) a −10 dB return loss (RL) bandwidth that spans from about 3.27 to about 3.9 GHz, which corresponds to a 17.6% relative bandwidth.

Although not wishing to be bound to any particular configuration, the CDE 1060 of FIGS. 11A-11B may be assembled using PCBs similar to the first and second PCBs of FIG. 4 and variations thereof, for example. Moreover, when fully inserted into the cross-shaped dielectric block 1050, the patterned "radiating" metallization associated with the first and second pairs of radiator dipole arms 1062*a*, 1062*a*', 1062*b*, 1062*b*' will extend immediately adjacent the dielectric radiating regions of the cross-shaped dielectric block 1050, which defines interior sidewalls of the slots 1052*a*-1052*d*. Referring now FIG. 12, a graph illustrating the S-parameters associated with the DRA 1050, 1060 of FIGS. 11A-11C is provided, which highlights: (i) a worst return loss (RL) among Sp1, p1 & Sn1, n1 throughout the system band (approximately 3.3 to 3.8 GHz) of less than −11 dB, (ii) a worst self-isolation (ISO=Sp1, n1) of less than −33.9 dB, and (iii) a −10 dB return loss (RL) bandwidth that spans from about 3.27 to about 3.9 GHz, which corresponds to a 17.6% relative bandwidth.

Figure 13A:
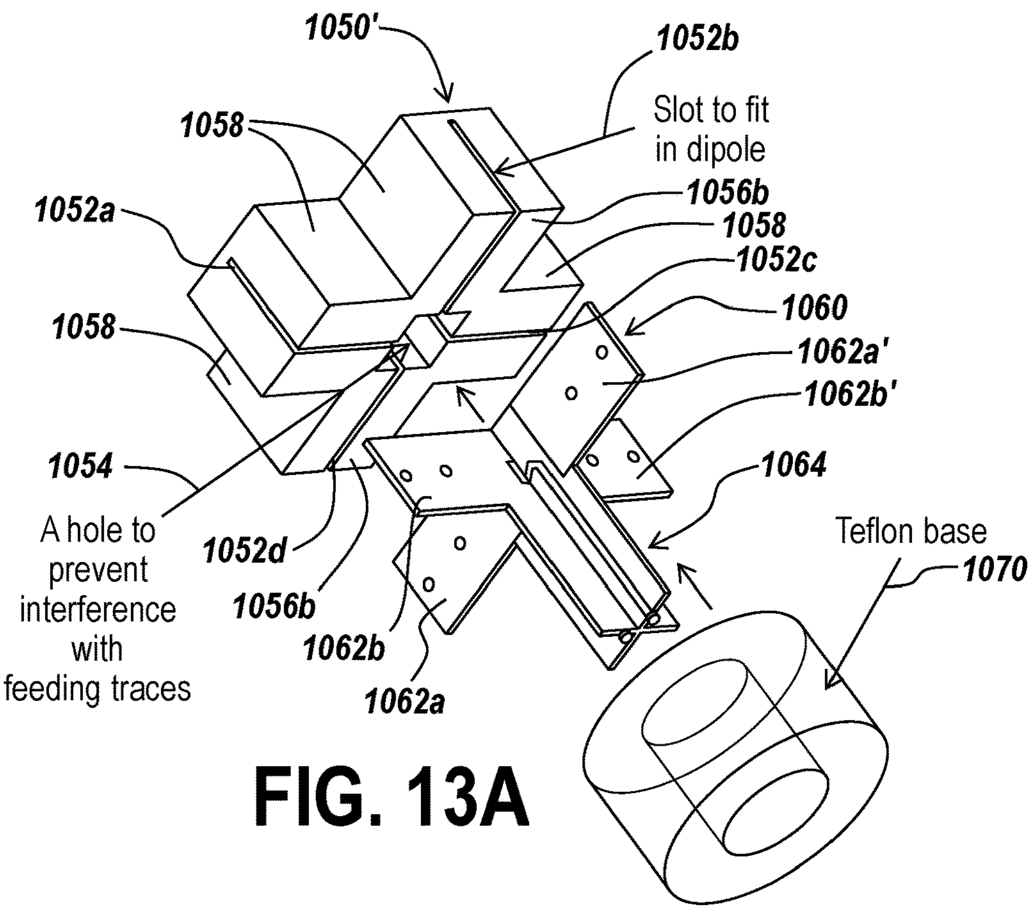
FIG. 13A is a perspective "exploded" view of the components of a dielectric resonator antenna (DRA) according to an embodiment of the invention, which includes: (i) a cross-shaped and unitary dielectric block having a plurality of slots therein, (ii) a cross-dipole radiating element (CDE) that operates as a dielectric-loaded CDE when inserted within the plurality of slots in the dielectric block, and (iii) an annular-shaped low-dielectric spacer (e.g., polytetrafluoroethylene, PTFE, dielectric constant=2.1) that surrounds a feed stalk of the CDE and supports the dielectric block above an underlying reflector.
Figure 13B:
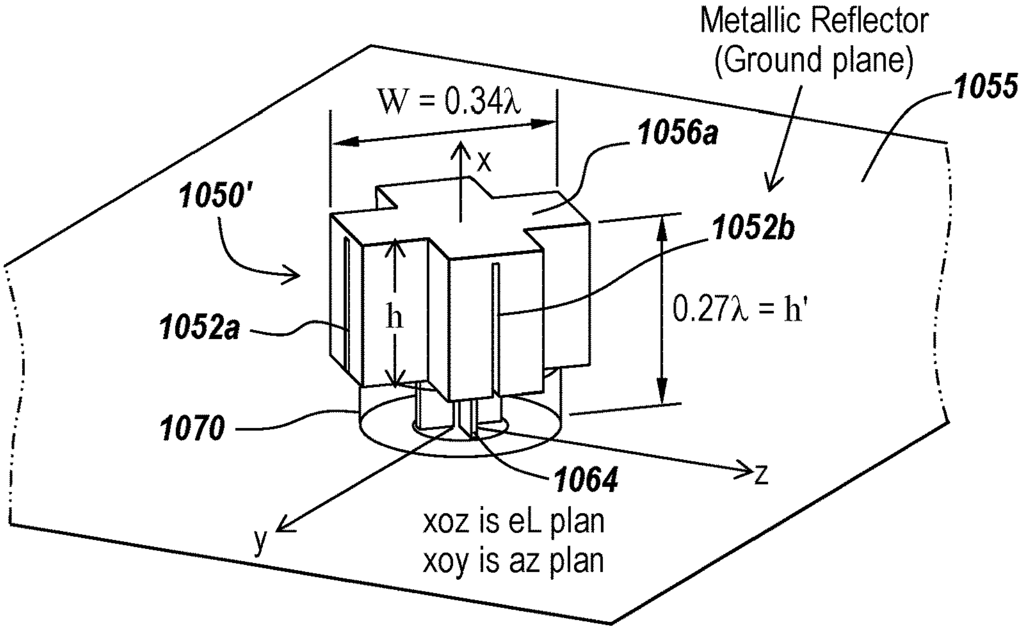
FIG. 13B is a perspective view of an assembled cross-shaped dielectric resonator antenna (DRA) containing the components of FIG. 13A, and ground-plane reflector, according to an embodiment of the invention that operates as a dielectric-loaded CDE (a/k/a/CDE-DRA).

Referring now to FIG. 13A, a dielectric resonator antenna (DRA) according to another embodiment of the invention is illustrated as including a cross-shaped dielectric block 1050', a cross-dipole radiating element (CDE) 1060, which may be partially embedded within the cross-shaped dielectric block 1050', and a dielectric spacer 1070, which surrounds at least a portion of the feed stalk 1064 of the CDE 1060 and supports the dielectric block 1050' above an underlying reflector 1055, as illustrated by FIG. 13B. This dielectric spacer 1070 may be annular-shaped spacer and may have a dielectric constant of less than about four (4), whereas the dielectric block 1050' may utilize a dielectric material having a dielectric constant of greater than about four (4). For example, the dielectric spacer 1070 may be a polymer such as polytetrafluoroethylene, and the dielectric block 1050' may be configured as an alumina block, which has a dielectric constant of 9.4.

As further shown by FIG. 13A, the cross-shaped dielectric block 1050' includes a cross-shaped, planar and forward-facing surface 1056*a*, which has a width "w" (e.g., w≈0.34λ) and a height h' relative to the reflector 1055 that is equal to about 0.27λ. In addition, a rear facing surface 1056*b* of the dielectric block 1050' is provided, which is defined by four (4) substantially L-shaped segments. These L-shaped segments are each defined by respective pairs of exterior sidewalls 1058 and a rectangular-shaped interior cavity 1054 having a longitudinal axis aligned to a center axis (e.g., x-axis) of the cross-shaped dielectric block 1050'. The cross-shaped dielectric block 1050' further includes a first pair of coplanar slots 1052*a*, 1052*c* and a second pair of coplanar slots 1052*b*, 1052*d*, which extend orthogonally relative to the first pair of coplanar slots 1052*a*, 1052*c*. These slots 1052*a*-1052*d* extend from the rear surface 1056*b* through a majority of the height "h" of the cross-shaped dielectric block 1050', as measured along the x-axis, where h is about equal to 0.2λ). Likewise, the cavity 1054 may also extend through a majority of the height "h" of the cross-shaped dielectric block 1050'.

As further shown by FIG. 13A, the CDE 1060 may include a first pair of radiator dipole arms 1062*a*, 1062*a*' defined as patterned metallization on a first dual-sided printed circuit board (PCB) and a second pair of radiator dipole arms 1062*b*, 1062*b*' defined as patterned metallization on a second dual-sided PCB. When mounted together in an orthogonal relationship, these first and second PCBs may further define a feed stalk 1064, which is configured to be mounted on and receive radio frequency (RF) feed signals through apertures in the reflector 1055. And, in an alternative embodiment that substitutes "air" for the dielectric spacer 1070, the feeding traces/network may be provided on (or above) a forward-facing surface of the reflector 1055. In addition, when fully inserted into the cross-shaped dielectric block 1050', the patterned "radiating" metallization associated with the first and second pairs of radiator dipole arms 1062*a*, 1062*a*', 1062*b*, 1062*b*' becomes pressed into contact (or closely adjacent) with the dielectric material of the cross-shaped dielectric block 1050', which defines interior sidewalls of the slots 1052*a*-1052*d*.

Figure 14:
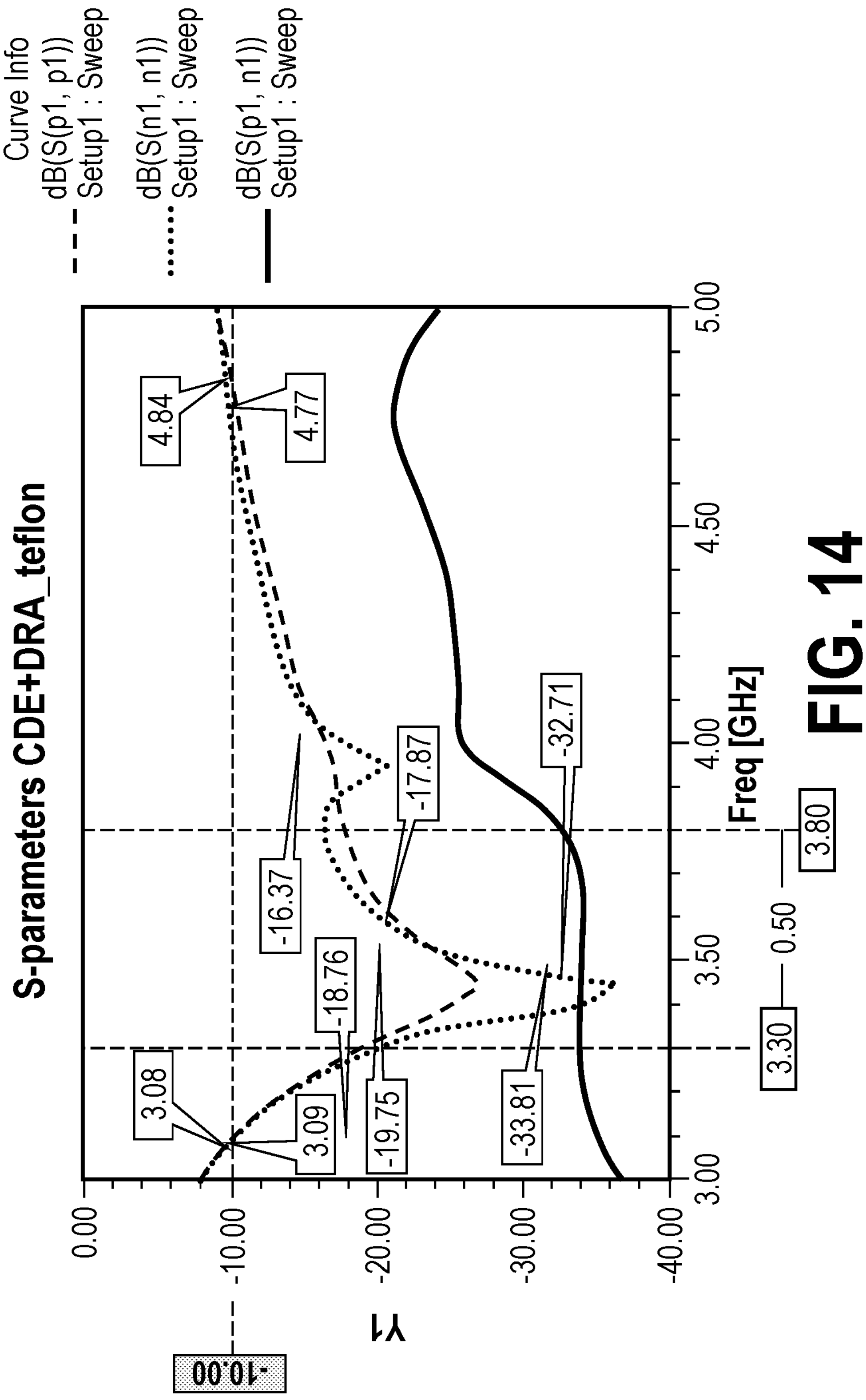
FIG. 14 is a graph illustrating the S-parameters associated with the DRA of FIGS. 13A-13B, which illustrates: (i) a worst return loss (RL) among Sp1, p1 & Sn1, n1 throughout the system band (approximately 3.3 to 3.8 GHz) of less than −16.37 dB, (ii) a worst self-isolation (ISO=Sp1, n1) of less than −32.7 dB, and (iii) a −10 dB return loss (RL) bandwidth that spans from about 3.09 to about 4.77 GHz, which corresponds to a 42.7% relative bandwidth and an improvement compared to the 17.6% relative bandwidth of FIG. 12.

Referring now to FIG. 14, a graph illustrating the S-parameters associated with the DRA of FIGS. 13A-13B is provided, which highlights: (i) a worst return loss (RL) among Sp1, p1 & Sn1, n1 throughout the system band (approximately 3.3 to 3.8 GHz) of less than −16.37 dB, (ii) a worst self-isolation (ISO=Sp1, n1) of less than −32.7 dB, and (iii) a −10 dB return loss (RL) bandwidth that spans from about 3.09 to about 4.77 GHz. This RL bandwidth corresponds to a 42.7% relative bandwidth and an improvement compared to the 17.6% relative bandwidth of FIG. 12.

Figure 15:
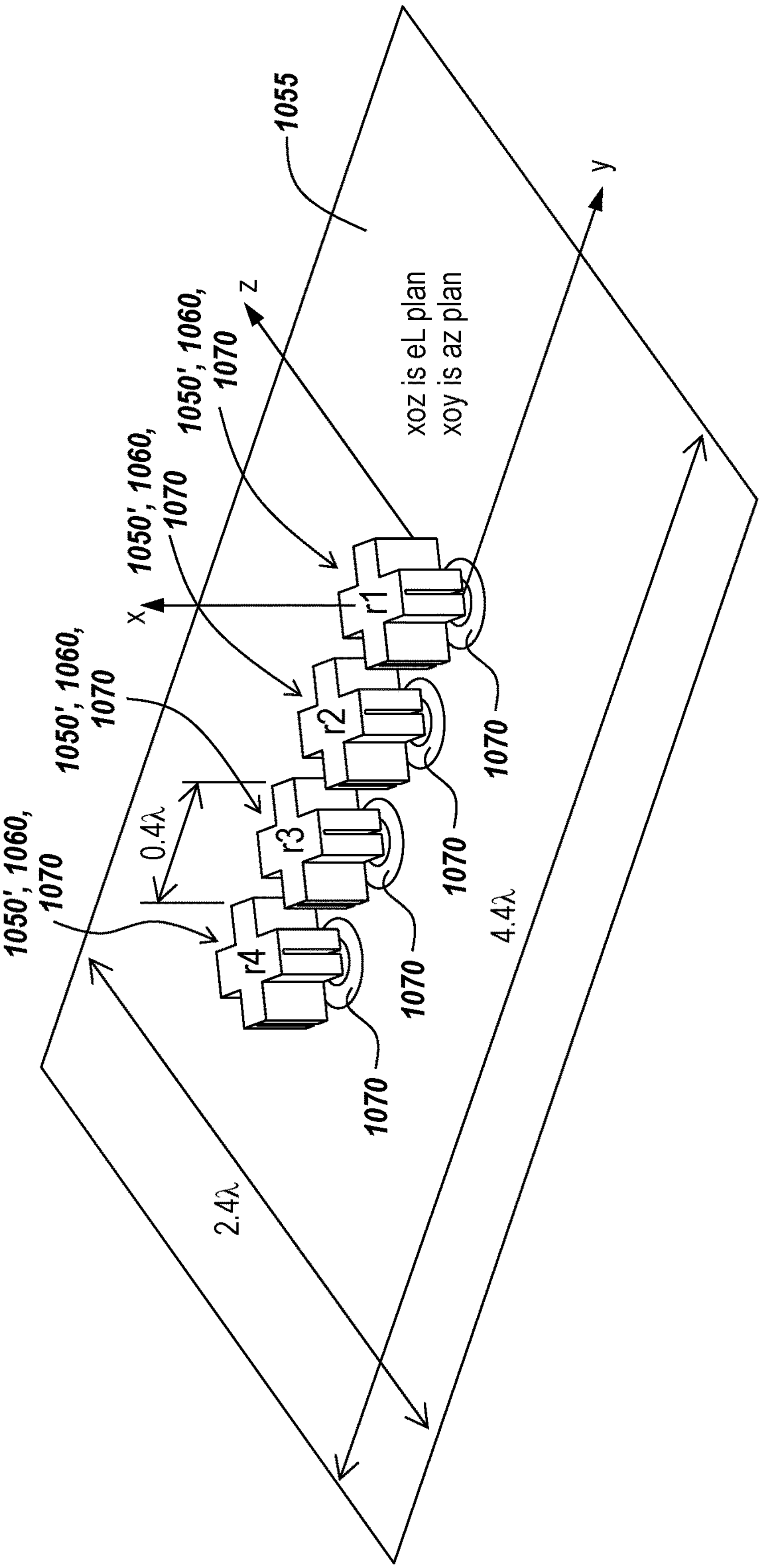
FIG. 15 is a perspective view of a CDE-DRA according to an embodiment of the invention, which includes a linear array of four (4) of the dielectric resonator antennas of FIGS. 13A-13B on a 4.4λ by 2.4λ ground plane reflector, where λ corresponds to a wavelength (in air) of a mid-band radio frequency (RF) signal associated with the linear array.

Referring now to FIG. 15, a dielectric resonator antenna (DRA) 1090 according to a further embodiment of the invention may include a 4-element linear array (r1, r2, r3 and r4) of the DRAs (1050', 1060, 1070) of FIG. 13A-13B, on a reflector 1055 having dimensions equivalent to at least 2.4λx4.4λ, with an inter-element spacing of about 0.4λ, where λ corresponds to a wavelength (in air) of a mid-band radio frequency (RF) signal.

Figure 16:
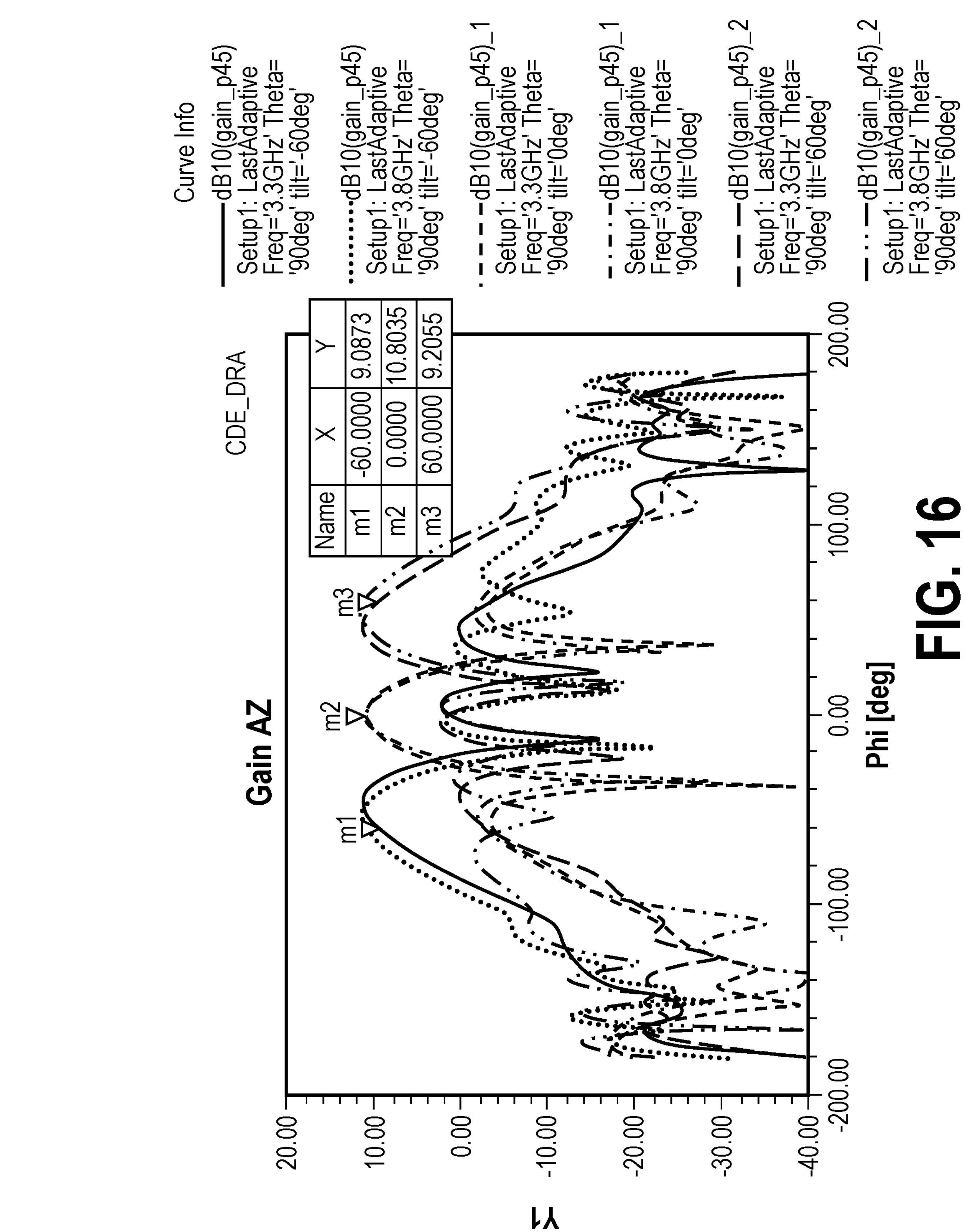
FIG. 16 is a graph that illustrates a gain pattern in the az-plane for the linear CDE-DRA of FIG. 15 within the operation band from about 3.3 GHz to about 3.8 GHz, where the gain varies from about 9.0873 dB to about 10.8035 dB over a full scan range from −60° to +60° in the azimuth plane
Figure 17:
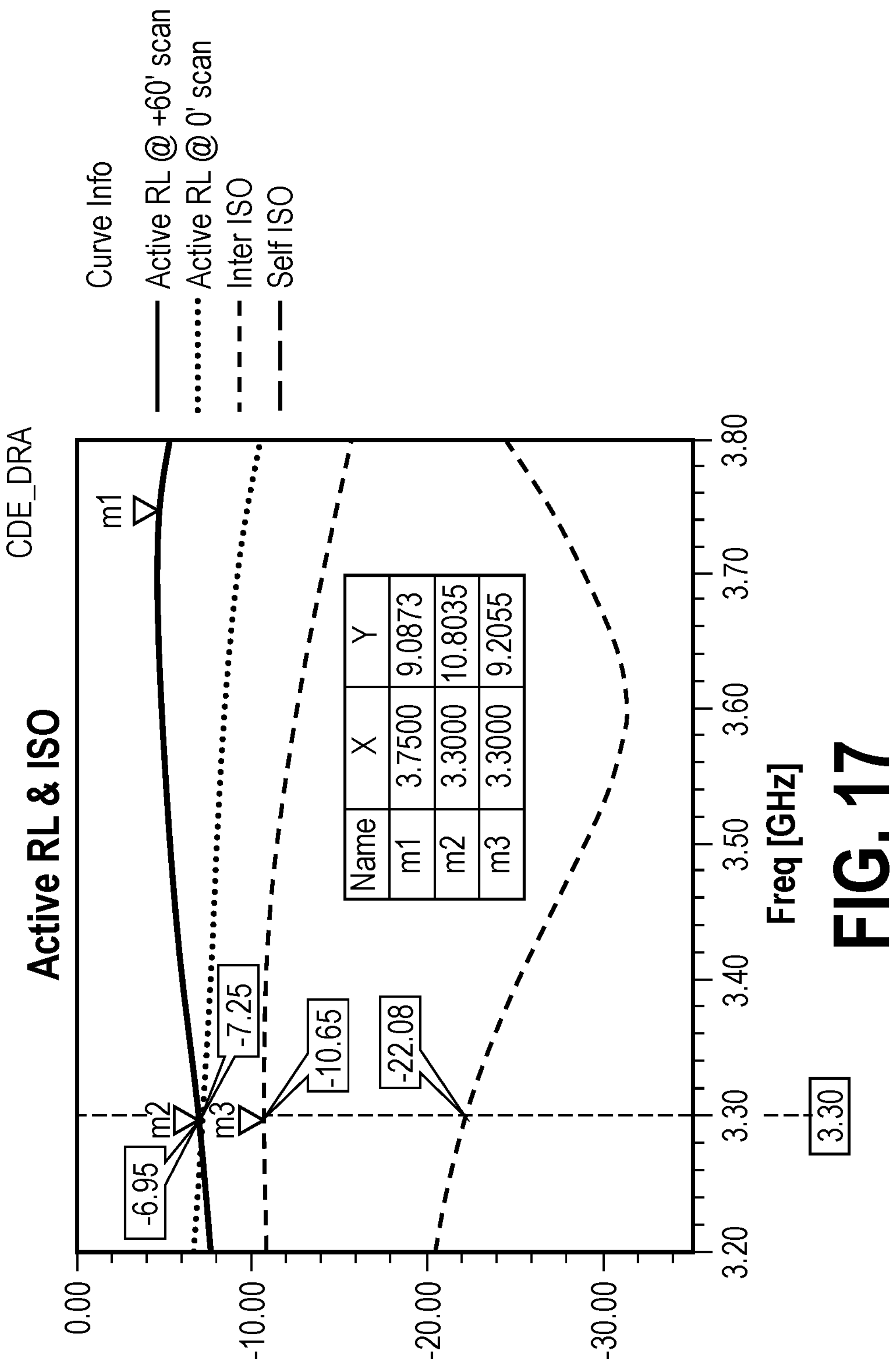
FIG. 17 is a graph that illustrates a worst active return loss (RL) of less than −4.75 dB (at 3.75 GHz, +60° scan), a worst inter ISO of less than −10.65 dB (at 3.3 GHz) and worst self ISO of less than −22.08 dB (at 3.3. GHz) for the CDE-DRA of FIG. 15.

And, as shown by FIG. 16, a graph is provided that illustrates a gain pattern in the az-plane for the linear CDE-DRA of FIG. 15 within the operation band from about 3.3 GHz to about 3.8 GHz, where the gain varies from about 9.0873 dB to about 10.8035 dB over a full scan range from −60° to +60° in the azimuth plane. In addition, FIG. 17 provides a graph that illustrates a worst active return loss (RL) of less than −4.75 dB (at 3.75 GHz, +60° scan), a worst inter ISO of less than −10.65 dB (at 3.3 GHz) and worst self ISO of less than −22.08 dB (at 3.3. GHz) for the CDE-DRA of FIG. 15.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An antenna, comprising:

a cross-polarized feed network responsive to first and second radio frequency (RF) input feed signals; and a dielectric radiating element (DRE) electromagnetically coupled by a resonant cavity to said cross-polarized feed network.

2. The antenna of claim 1, wherein said DRE comprises a cylindrically-shaped or dome-shaped dielectric material.

3. The antenna of claim 1, further comprising an electrically conductive patch radiator, which is responsive to a plurality of RF feed signals provided by said cross-polarized feed network.

4. The antenna of claim 1, wherein the resonant cavity extends within a metallized polymer disc having a circular metallic patch radiator thereon.

5. The antenna of claim 4, wherein said DRE comprises a nested arrangement of a plurality of dielectric radiating sub-elements, on the patch radiator.

6. The antenna of claim 5, wherein the plurality of dielectric radiating sub-elements comprises N+1 dielectric radiating sub-elements, where N is a positive integer; and wherein N of the dielectric radiating sub-elements are received within an N+1th dielectric radiating sub-element.

7. The antenna of claim 6, wherein at least some of the plurality of dielectric radiating sub-elements are cylindrically-shaped or dome-shaped.

8. The antenna of claim 1, wherein the resonant cavity is external to the DRE.

9. An antenna, comprising:

a dielectric radiating element (DRE) electromagnetically coupled through a polymer-filled resonant cavity to a cross-polarized feed network, which is responsive to a pair of radio frequency (RF) input feed signals.

10. The antenna of claim 9, wherein the polymer-filled resonant cavity is cylindrically shaped.

11. The antenna of claim 9, wherein said polymer-filled resonant cavity extends within a metallized polymer disc.

12. The antenna of claim 11, wherein said DRE is electromagnetically coupled to the resonant cavity via an annular-shaped slot in the metallized polymer disc.

13. The antenna of claim 11, wherein the metallized polymer disc comprises an electrically conductive patch radiator; and wherein the cross-polarized feed network comprises a plurality of electrically conductive vias, which extend through the polymer-filled resonant cavity and are electrically connected to respective portions of the patch radiator.

14. The antenna of claim 9, wherein said DRE comprises a cylindrically-shaped or dome-shaped dielectric material.

15. A dielectric resonator antenna (DRA), comprising:

a dielectric block having a plurality of slots therein; and a cross-dipole radiating element (CDE) sufficiently embedded within the plurality of slots that said dielectric block operates as a dipole-fed DRA.

16. The DRA of claim 15, wherein said dielectric block is a cross-shaped dielectric block.

17. The DRA of claim 16, wherein the plurality of slots includes four slots aligned along a pair of orthogonal axes of the cross-shaped dielectric block.

18. The DRA of claim 17, wherein said dielectric block has a cavity therein that surrounds a feed stalk of said CDE.

19. The DRA of claim 18, wherein the cavity has a longitudinal axis aligned to an intersection between the pair of orthogonal axes.

20. The DRA of claim 19, wherein said CDE comprises a pair of printed circuit board dipoles; wherein the cavity is rectangular shaped; and wherein the feed stalk of said CDE divides the cavity into four air-filled quadrants.

* * * * *